United States Patent
Lee et al.

(10) Patent No.: US 8,869,202 B2
(45) Date of Patent: Oct. 21, 2014

(54) MOBILE TERMINAL AND METADATA APPLYING METHOD THEREOF

(75) Inventors: Choonsik Lee, Seoul (KR); Younghun Nam, Seoul (KR); Donghyun Lee, Incheon (KR)

(73) Assignee: LG Electronics Inc., Seoul (KR)

( * ) Notice: Subject to any disclaim, the term of this patent is extended or adjusted under 35 U.S.C. 154(b) by 29 days.

(21) Appl. No.: 13/187,823

(22) Filed: Jul. 21, 2011

(65) Prior Publication Data

US 2012/0120317 A1    May 17, 2012

(30) Foreign Application Priority Data

Nov. 16, 2010    (KR) ............... 10-2010-0113812

(51) Int. Cl.
*H04N 5/445* (2011.01)
*G06F 17/30* (2006.01)

(52) U.S. Cl.
CPC .... *G06F 17/30852* (2013.01); *G06F 17/30817* (2013.01); *G06F 17/30855* (2013.01)
USPC .............. 725/40; 725/32; 725/33; 725/42

(58) Field of Classification Search
None
See application file for complete search history.

(56) References Cited

U.S. PATENT DOCUMENTS

| | | | |
|---|---|---|---|
| 6,724,926 B2 * | 4/2004 | Jones et al. | 382/135 |
| 6,774,926 B1 | 8/2004 | Ellis et al. | |
| 7,197,715 B1 * | 3/2007 | Valeria | 715/747 |
| 7,694,885 B1 | 4/2010 | Bourdev | |
| 2003/0028873 A1 * | 2/2003 | Lemmons | 725/36 |
| 2003/0131357 A1 * | 7/2003 | Kim | 725/60 |
| 2004/0078814 A1 * | 4/2004 | Allen | 725/47 |
| 2004/0264780 A1 | 12/2004 | Zhang et al. | |
| 2008/0313570 A1 | 12/2008 | Shamma et al. | |
| 2009/0187825 A1 | 7/2009 | Sandquist et al. | |

FOREIGN PATENT DOCUMENTS

CN    1431826 A    7/2003
WO    WO 2007/128003 A2    11/2007

* cited by examiner

*Primary Examiner* — Cai Chen
(74) *Attorney, Agent, or Firm* — Birch, Stewart, Kolasch & Birch, LLP

(57) ABSTRACT

A mobile terminal including a wireless communication configured to wirelessly communicate with at least one other terminal; a touch screen display unit configured to display a video; and a controller configured to receive metadata that can be displayed in association with the video and to control the display unit to display a metadata information indication indicating the metadata is available.

18 Claims, 38 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

Object 1 : Red
Object 2 : Blue (a)

(b)

(a)

(b)

(a)

(a)

(b)

(a)

(b)

MOBILE TERMINAL AND METADATA APPLYING METHOD THEREOF

Pursuant to 35 U.S.C. §119(a), this application claims the benefit of earlier filing date and right of priority to Korean Application No. 10-2010-0113812, filed on Nov. 16, 2010, the contents of which are hereby incorporated by reference herein in their entirety.

BACKGROUND OF THE INVENTION

1. Field of the Invention

The present invention relates to a mobile terminal, and more particularly, to a mobile terminal and metadata applying method thereof. Although the present invention is suitable for a wide scope of applications, it is particularly suitable for utilizing metadata in various ways.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be possible to consider the improvement of structural part and/or software part of the terminal.

According to a related art, when displaying an image provided by a web server, a mobile terminal can provide a user with such simple information on image settings as information on a person having uploaded metadata of the image, update date information, image taken date information and the like.

However, when content is played in the mobile terminal, it is not enough to meet a user's intention to receive various kind of information on a currently played content.

Moreover, as mentioned in the above description, the user is just provided with such a service as a simple display of the metadata set on the current-played content.

SUMMARY OF THE INVENTION

Accordingly, the present invention is directed to a mobile terminal and metadata applying method thereof that substantially obviate one or more problems due to limitations and disadvantages of the related art.

An object of the present invention is to provide a mobile terminal and metadata applying method thereof, by which metadata of various types set on a currently played video can be provided using an efficient output method.

Another object of the present invention is to provide a mobile terminal and metadata applying method thereof, by which various kinds of services can be performed using the metadata set on the currently played content.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes an output unit outputting a video including at least one object and a controller generating metadata-related information using at least one metadata set on at least one selected from the group consisting of the at least one object, at least one still image included in the video and the video, the controller controlling the output unit to output the generated metadata-related information.

In another aspect of the present invention, a method of applying metadata in a mobile terminal includes the steps of outputting a video, generating metadata-related information using at least one metadata set on at least one selected from the group consisting of at least one object included in the video, at least one still image included in the video and the video, and outputting the generated metadata-related information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a circumstance applicable to a mobile terminal only, it is apparent to those skilled in the art that the configurations according to an embodiment described in this disclosure is applicable to such a stationary terminal as a digital TV, a desktop computer and the like.

Figure 1:
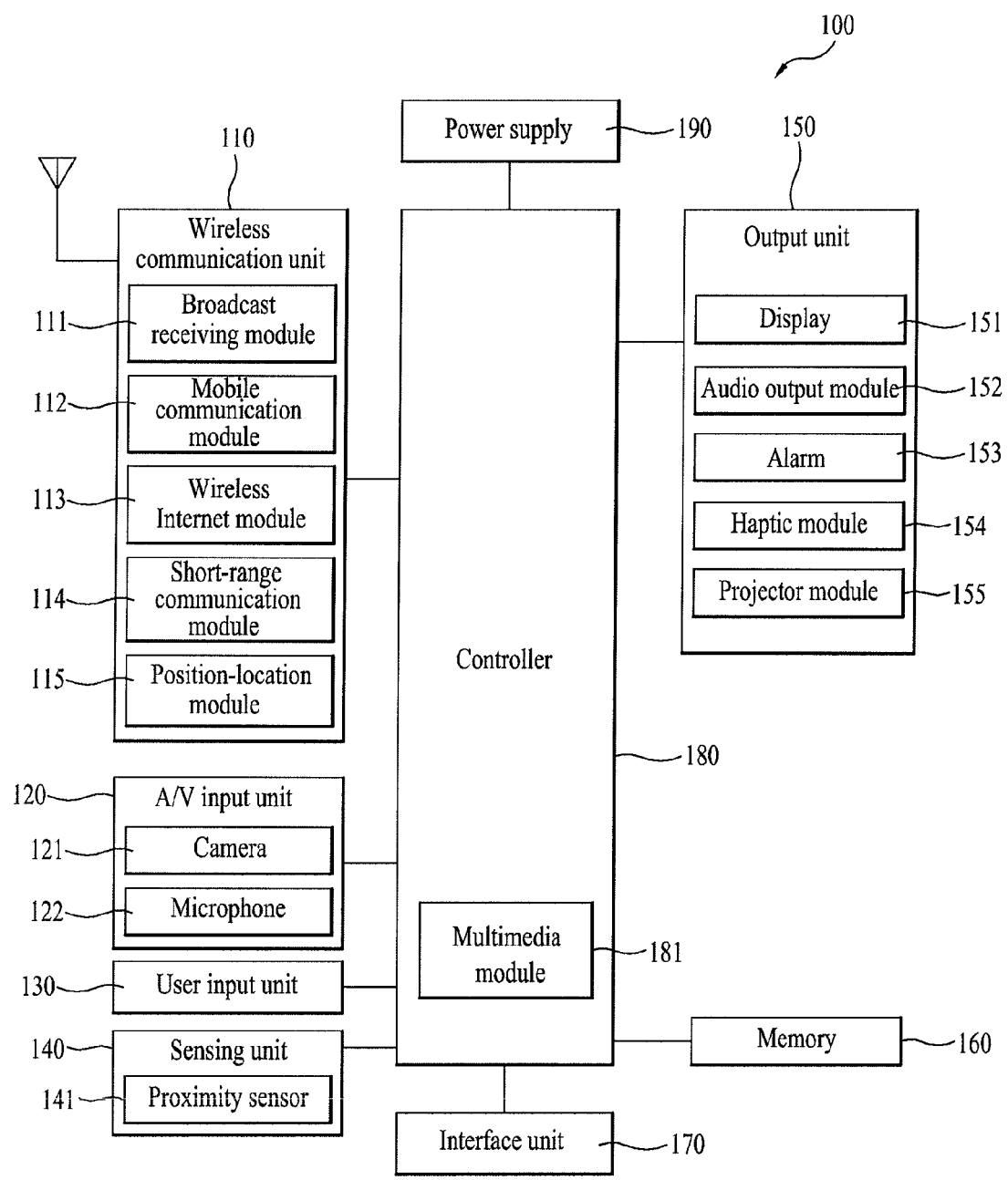
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which includes a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hot/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. In addition, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

First of all, a mobile terminal mentioned in the following description can include at least one of the components shown in FIG. 1. Moreover, the mobile terminal can include a wireless communication unit 110 configured to transceive data with an external server via a network.

Contents or data, on which the metadata mentioned in the present specification can be set, can include images (e.g., still images, videos, etc.), audios, document files, flash files, applications, web documents, web pages and the like, by which the present invention is non-limited.

When a corresponding content is an image, metadata can be set on the image or a specific object included in the image. In particular, if a corresponding content is a video, metadata can be set on a specific one of a plurality of still images included in the video.

Metadata (or attribute information) mentioned in the present specification is the data set on a content according to a predetermined rule to describe or define data. The metadata is usable for the purpose of representing a corresponding content. In addition, the metadata is also usable for the purpose of finding a corresponding content quickly.

For instance, date/hour information of creation of metadata-set content or date/hour information of upload to a content managing server, a creation subject information (e.g., person or terminal information) of a corresponding content or upload subject information of a corresponding content, weather information (e.g., temperature, humidity, etc.) on creation of a corresponding content, terminal position information on a corresponding content creation and the like can be included in the metadata.

Moreover, comment information (e.g., comment) on a corresponding content, information (e.g., phone number, blog address, ID information registered with a social network service, etc.) on a specific terminal (or a specific person), history information (e.g., information on terminals having used a corresponding content, etc.) on a use of the corresponding content, information searched from a web server using a corresponding content or a specific object included in the corresponding content and the like can be included in the metadata.

Assuming that a corresponding content is an image, a specific object itself included in the image, a position information of a specific object included in the image, a sex distinction index (or a sex distributed extent) of persons included in the image, an activity index (or a motion extent) of objects included in the image, a color index (or a color distribution extent) of color included in the image and the like can be included in the metadata.

Assuming that a corresponding content is a video, a motion pattern (e.g., motion of interest: MOI) for a predetermined period of time of a specific object included in the video, a mark information on a specific part (e.g., an interval between 30 seconds and 1 minute from a play start point, etc.) within the video and the like can be included in the metadata.

Identification information on a content having a metadata set thereon is included in the metadata. In addition, identification information on a metadata set on a content can be included in the corresponding content. This is to search for a content having a metadata set thereon using the corresponding metadata and to search for a content set on the metadata using the corresponding content. In this instance, regarding the identification information, any information for identifying a corresponding content or a corresponding metadata is non-limited by its type or configuration.

Metadata can be stored and managed separately from a content having the metadata set thereon. Alternatively, the metadata can be stored and managed in a manner of being included in the content having the metadata set thereon. Of course, the metadata is non-limited by the above examples and can be set to have more various information in association with the corresponding content.

The metadata-related information mentioned in the present specification can include at least one of an indication information, a type information, a number information, a schematic content information, a representative content information and an index information as the information on the metadata set on the corresponding video.

The metadata-related information can be generated by the mobile terminal 100. In addition, the metadata-related information is generated by a metadata managing server 210 and can be then provided to the mobile terminal 100.

The metadata-related information is generated by the mobile terminal 100 in a following manner. First of all, the mobile terminal 100 searches the memory 160 for metadata per video or receives the metadata per video from the metadata managing server 210. Secondly, the mobile terminal 100 can then generate the metadata-related information per video using the found or received per-video metadata.

When the metadata-related information is generated by the metadata managing server 210, the mobile terminal 100 can receive the per-video metadata-related information from the metadata managing server 210. In doing so, the per-video metadata can be regarded as stored in the metadata managing server 210.

For instance, if information regarding 3 positions, 2 comments and 1 temperature are set as metadata for a specific video, the metadata-related information can include number information set to '6', type information set to 'position, comment, temperature', per-type number information set to 'positions_3, comments_2, temperature_1', and index information set to 'Level 1 for position information having the greatest number, Level 2 for comment information having the second greatest number, Level 3 for temperature information having the smallest number'.

Of course, when the metadata is stored and managed in a manner of being included in a video, the metadata and the metadata-related information can be stored and managed by a content managing server 220.

In the following description, a metadata management system, to which the present invention is applicable, is described with reference to FIG. 2. In the following description, a transmission by a terminal (or a reception by a server) includes an upload. In addition, a reception by a terminal (or a transmission by a server) can include a download.

Figure 2:
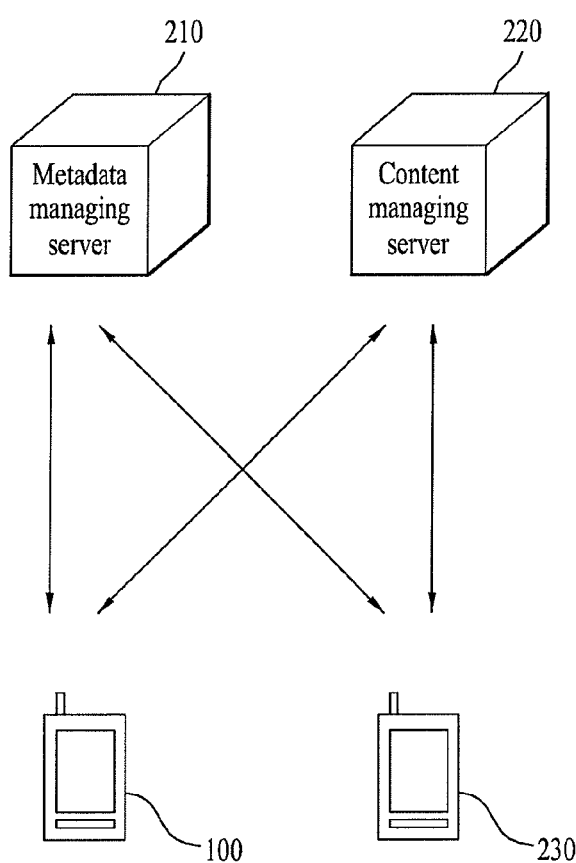
FIG. 2 is a diagram of a metadata management system according to an embodiment of the present invention.

FIG. 2 is a diagram of a metadata management system according to an embodiment of the present invention.

Referring to FIG. 2, a metadata management system according to an embodiment of the present invention includes a metadata managing server 210 configured to manage and store metadata, a content managing server 220 configured to manage and store contents, and a plurality of terminals (e.g., a mobile terminal 110 and a counterpart terminal 230 included) configured to transceive the metadata and the contents with the metadata managing server 210 and the content managing server 220, respectively.

The mobile terminal 100 or the counterpart terminal 230 transmits content to the content managing server 220 and is also able to transmit a metadata set on the transmitted content to the metadata managing server 210.

The mobile terminal 100 or the counterpart terminal 230 receives the content stored in the content managing server 220 from the content managing server 220 and can receive the metadata set on the received content from the metadata managing server 210.

For instance, the content managing server 220 provides the metadata managing server 210 with the identification information of the content currently provided to the mobile terminal 100. In addition, the metadata managing server 210 can provide the mobile terminal 100 with the metadata containing the provided identification information as the metadata set on the content currently provided to the mobile terminal 100.

Thus, the mobile terminal 100 can individually transceive the metadata and the content having the metadata set thereon with the servers 210 and 220 for managing and storing the metadata and the content, respectively.

Therefore, a plurality of the terminals 100 and 230 can share the metadata and the metadata set content with each other via the metadata managing server 210 and the content managing server 220.

If the terminals are accessible to the metadata managing server 210 and the content managing server 220, they can share the metadata and the corresponding metadata set content with each other. Alternatively, only the terminals registered with the metadata and contents sharing service are allowed to share the metadata and the metadata set contents with each other.

According to the above description, the metadata and the metadata set content are managed and stored by the corresponding servers 210 and 220, respectively. Yet, the metadata and the metadata set content can be managed by an integrated server by separating storage regions of the metadata and the metadata content from each other. Moreover, the metadata can be stored and managed in a manner of being contained in the content on which the metadata is set. In other words, the metadata and the corresponding metadata ser content can be stored and managed as one data instead of being managed and stored as separate data.

In the following description, a method of utilizing metadata in a mobile terminal according to an embodiment of the present invention is explained in detail with reference to the accompanying drawings. For clarity and convenience of the following description, metadata-set content is limited to a video.

Figure 3:
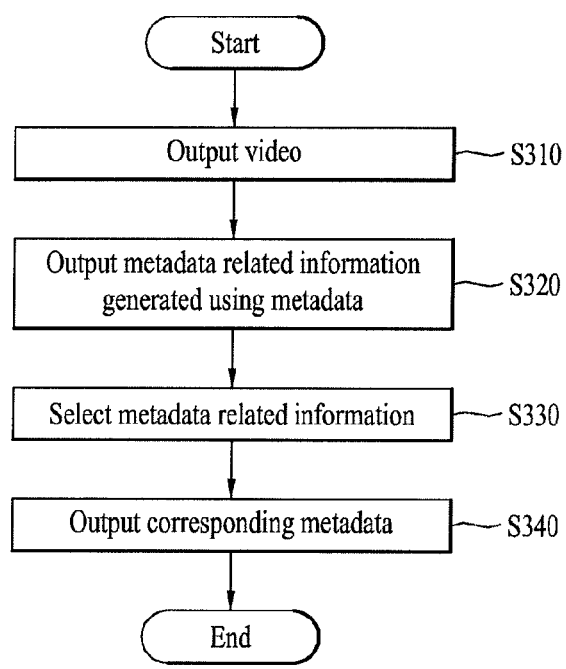
FIG. 3 is a flowchart for a method of utilizing metadata in a mobile terminal according to one embodiment of the present invention.

FIG. 3 is a flowchart for a method of utilizing metadata in a mobile terminal according to one embodiment of the present invention. Referring to FIG. 3, the mobile terminal 100 outputs a video including at least one or more objects using the output unit 150 under the control of the controller 180 (S310).

In this instance, the video includes a plurality of still images. In addition, each of a plurality of the still images can include at least one or more objects. The video has a play time amounting to a predetermined time and can include a video signal and an audio signal synchronized with the video signal. In particular, the video signal is output via the display unit 151 and the audio signal can be output via the audio output module 152.

The video output in the outputting step S310 can include one of at least one video stored in the memory 160, at least one video stored in the content managing server 220 and at least one video stored in a web server (not shown in the drawing) linked with a web site.

Before the video is output, a user can select a specific video from a video list including at least one or more videos. Therefore, the mobile terminal 100 can output the video selected by the user in the outputting step S310.

For instance, the video list can include one of the at least one video stored in the memory, the at least one video stored in the content managing server 220 (e.g., if the content managing server 210 is connected), and the at least one video stored in the web server (not shown in the drawing) linked with the web site (e.g., if the web server is connected).

In displaying the video list, the mobile terminal 100 can display the metadata-related information (described in detail) on each of the at least one or more videos included in the video list under the control of the controller 180.

For instance, when the video included in the video list is stored in the memory 160, the metadata-related information can be generated by the controller 180. In another instance, when the video included in the video list is stored in the content managing server 220, the metadata-related information can be generated by the metadata managing server 210 (if the metadata and the video are separately stored and managed) or the content managing server 220 (if the metadata is stored and managed in a manner of being included in the corresponding video).

In the following description, a method of displaying metadata-related information on a video list is explained with reference to FIGS. 4A to 4C. In the following description, assume that a metadata-present video among at least one or more videos included in the video list can be identifiably displayed.

Figure 4A:
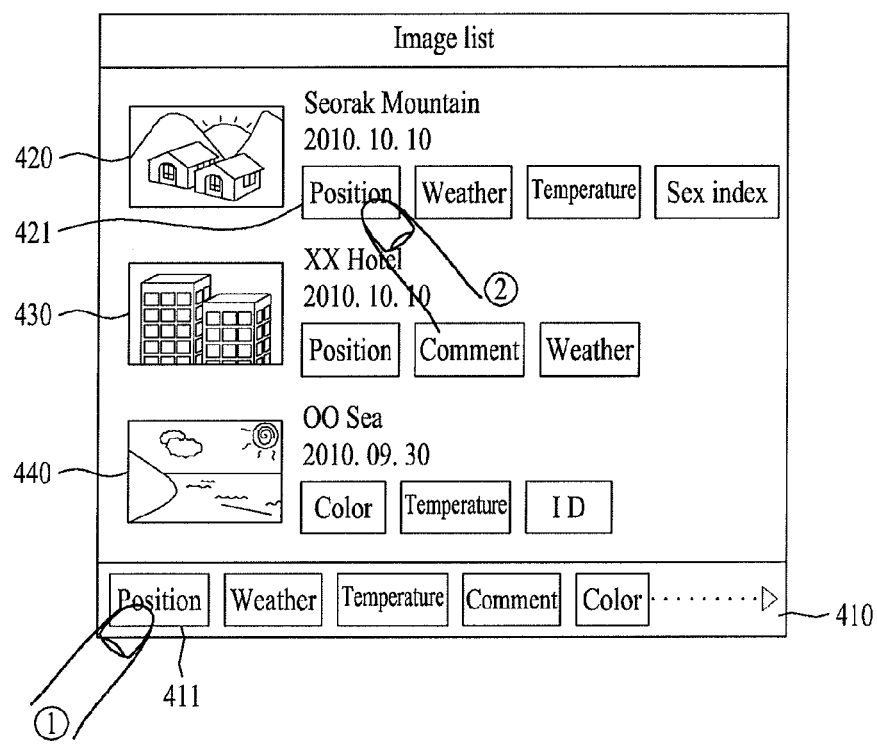
FIGS. 4A to 4C are diagrams for displaying metadata-related information on a image list according to an embodiment of the present invention.
Figure 4B:
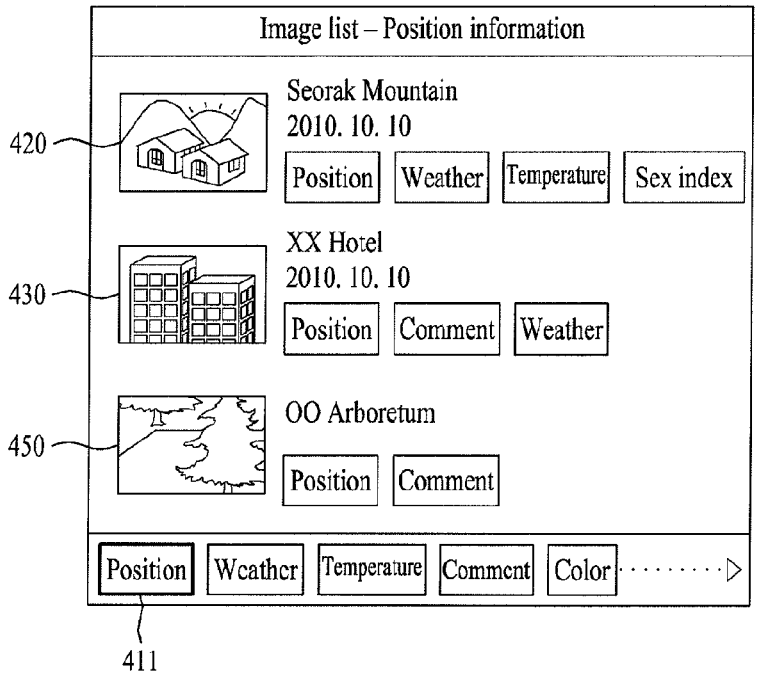
Figure 4C:
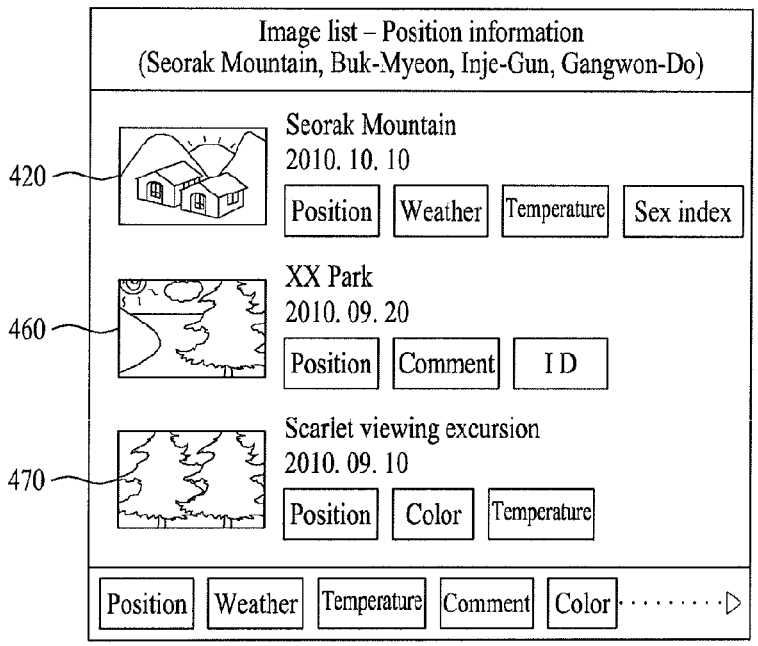

FIGS. 4A to 4C are diagrams for displaying metadata-related information on a video list according to an embodiment of the present invention.

Referring to FIG. 4A, the mobile terminal 100 displays a video list including a plurality of videos 420 to 440 and can indicate a metadata type set on each of a plurality of the videos 420 to 440.

For instance, it is displayed that the metadata having types of position, weather, temperature and sex distinction index is set on the first video 420. It is displayed that the metadata having types of position, comment and temperature is set on the second video 430. In addition, it is displayed that the metadata having types of color index, temperature and ID (e.g., example of counterpart information) is set on the third video 440.

In addition, a type list including the metadata types can be displayed on a prescribed region 410 of the screen. This is to receive a selection of a metadata type from a user and to sort the videos, on which the metadata corresponding to the selected metadata type is set, only.

Referring to FIG. 4B, when the position 411 is selected from the type list shown in FIG. 4A (①), the mobile terminal 100 can display a video list including the videos 420, 430 and 450 on which position information is set as metadata. In doing so, in order to indicate that the currently displayed video list relates to the metadata type 'position', the position 411 can be identifiably displayed in the type list.

Of course, when a plurality of types (e.g., position and weather) are selected from the type list shown in FIG. 4A, the mobile terminal 100 can display a video list including videos including both of position information and weather information or videos including at least one of the position information and the weather information.

Referring to FIG. 4C, of a position 421 displayed for the first video 420 is selected in FIG. 4A (□), the mobile terminal 100 can display a video list including videos 420, 460 and 470 on which position information (e.g., Seorak Mountain, Buk-Myeon, Inje-Gun, Gangwon-Do) set on the first video 420 is set as metadata.

Of course, when a plurality of types (e.g., position and weather) are selected for the first video 420 in FIG. 4A, the mobile terminal 100 can display a video list including videos including both of position information and weather information set on the first video 420 or videos including at least one of the position information and the weather information.

Moreover, when receiving an input of a video output command action on a specific video included in the video list shown in one of FIGS. 4A to 4C, the mobile terminal 100 can play the specific video. When receiving a metadata output command action, the mobile terminal 100 can output the metadata set on the specific video. For instance, the video output command action includes a touch performed once or a single touch. In addition, the metadata output command action can include plural touches or a multi-touch. Optionally, a key or a key zone for receiving an input of each of the video output command action and the metadata output command action can be separately provided to the mobile terminal 100.

Referring now to FIG. 3, the mobile terminal 100 outputs the metadata-related information, which is generated using the at least one metadata set on the video currently output in the outputting step S310, via the output unit 150 under the control of the controller 180.

In this instance, if the metadata is set on the video, it can mean that the metadata is set on at least one of at least one object included in the video, at least one still image included in the video, at least one partial video included in the video and at least one of all videos.

As mentioned in the foregoing description, the metadata-related information is generated by the mobile terminal 100 or can be generated by the metadata managing server 210 or the content managing server 220, under the control of the controller 180.

In the following description, generating the metadata-related information by the mobile terminal 100 is explained in detail.

First of all, the mobile terminal 100 searches the per-video metadata stored in the memory 160 for at least one metadata-related to a currently output video or can be provided with at least one metadata-related to a currently output video from the metadata managing server 210 or the content managing server 220.

In this instance, because the identification information on the corresponding video can be included in the metadata, the mobile terminal 100 or the metadata managing server 210 can identify the metadata-related to the currently output video. Moreover, if the metadata is set on a specific object, a specific still image or a specific video part of the corresponding video, the identification information on the specific object, the specific still image or the specific video part can be included in the metadata.

The mobile terminal 100 can generate the metadata-related information on the currently output video using the found or provided at least one metadata under the control of the controller 180.

In the outputting step S320, when currently outputting a part corresponding to at least one of the metadata set object, the metadata set still image and the metadata set partial video (cf. the step S310), the mobile terminal 100 can output metadata indication information as the metadata-related information.

For instance, it can output the metadata indication information using at least one of an icon, a text, an image, an alarm sound/vibration, a popup window and the like.

In the following description, a process for outputting metadata indication information as metadata-related information is explained in detail with reference to FIGS. 5A to 5D.

FIGS. 5A to 5D are diagrams for outputting metadata indication information on a currently output part in the course of outputting a video according to an embodiment of the present invention.

For clarity and convenience of the following description, assume that a current state is a video play state or a video output state. An indicator (i.e., 'Playing') 501 indicating the video play state is displayed on a prescribed region of the screen. In addition, key zones 502 to 504 for controlling the video play state can be displayed on a prescribed region of the screen as well. In this instance, whether to display the indicator 501 or the key zones 502 to 504 can be determined in accordance with a user selection.

Figure 5A:
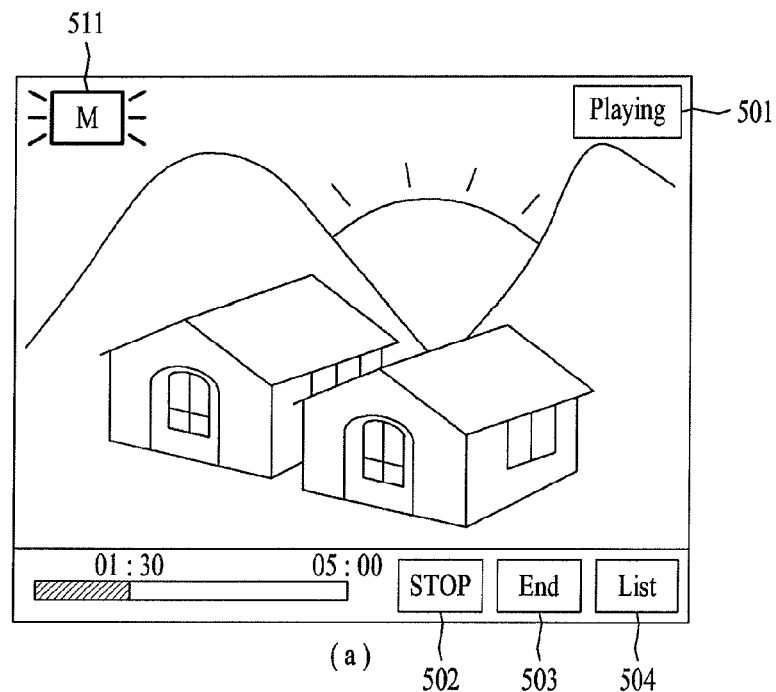
FIGS. 5A to 5D are diagrams for outputting metadata indication information on a currently output part in the course of outputting a video according to an embodiment of the present invention.
Figure 5A:
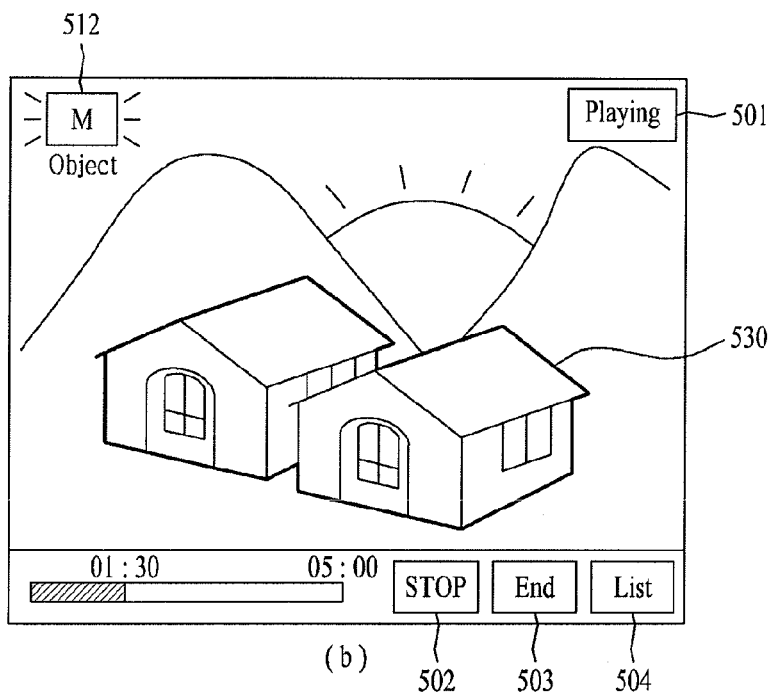

Referring to FIG. 5A, when metadata is set on a currently output part, the mobile terminal 100 can display an indication icon (M) 511 on a prescribed region of the screen as metadata indication information (FIG. 5A(a)).

In particular, when at least one metadata is set on a specific object, a still image or a partial video, which corresponds to the currently output part, the indication icon 511 can be displayed. In more detail, whether the currently output part corresponds to the object, the still image or the partial video can be displayed in a manner of being included in the indication icon 511.

Moreover, the mobile terminal 100 can perform at least one of an alarm sound output, an alarm vibration output, an alarm lamp output and the like together with the display of the indication icon 511.

Specifically, if the metadata is set on the specific object 530 corresponding to the currently output part, the mobile terminal 100 can identifiably display the specific object 530. In addition, the mobile terminal 100 can further display information (e.g., 'Object') indicating that the currently output part corresponds to the specific object 530 in a manner that the corresponding information is added to the indication icon 512 (FIG. 5A(b)).

Furthermore, the mobile terminal 100 can display the indication icon 512 in a manner of linking the indication icon 512 with the specific object 530.

Figure 5B:
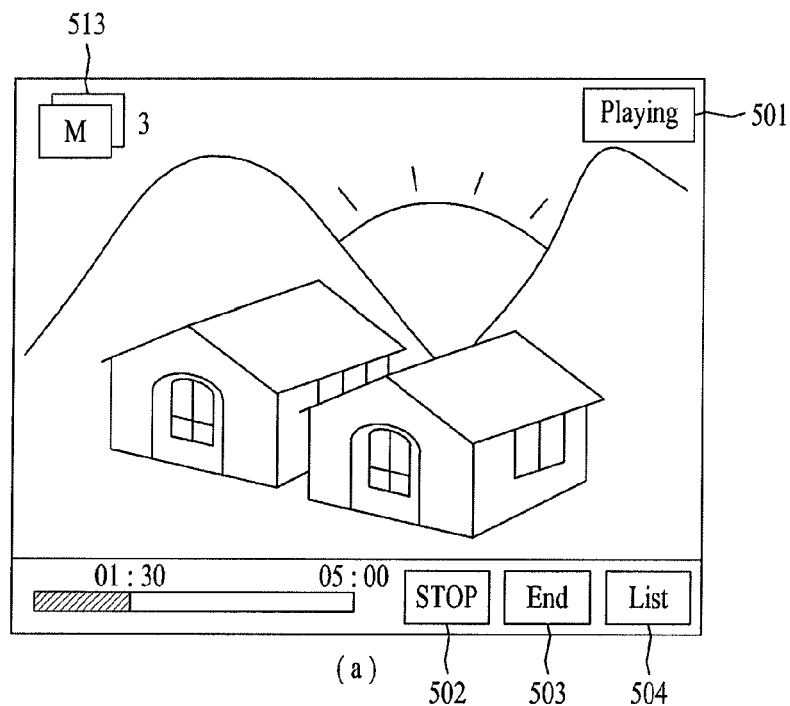
Figure 5B:
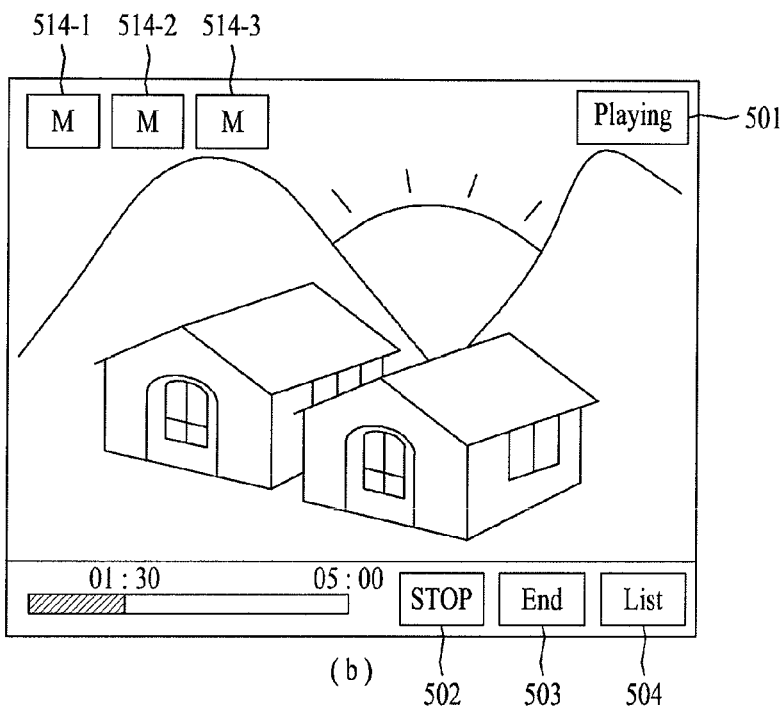

Referring to FIG. 5B, when a plurality of metadata are set on a currently output part, the mobile terminal 100 displays an integrated indication icon 513 together with the number of the set metadata (FIG. 5B(a) or can display individual indication icons 514-1 to 514-3 amounting to the number of the set metadata (FIG. 5B(b)).

In this instance, the integrated indication icon 513 corresponds to a plurality of the set metadata all. In addition, the individual indication icons 514-1 to 514-3 can correspond to a plurality of the set metadata, respectively.

Figure 5C:
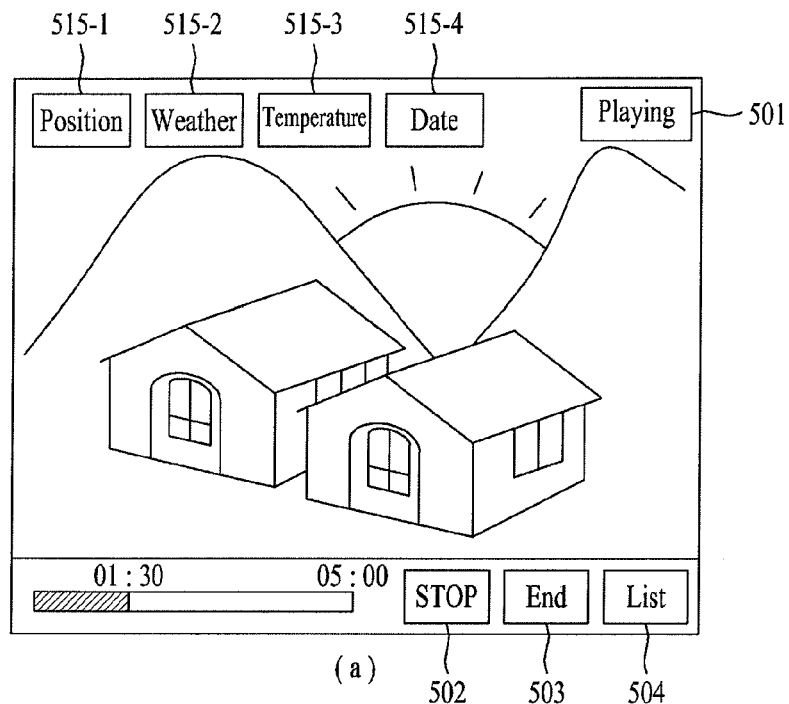
Figure 5C:
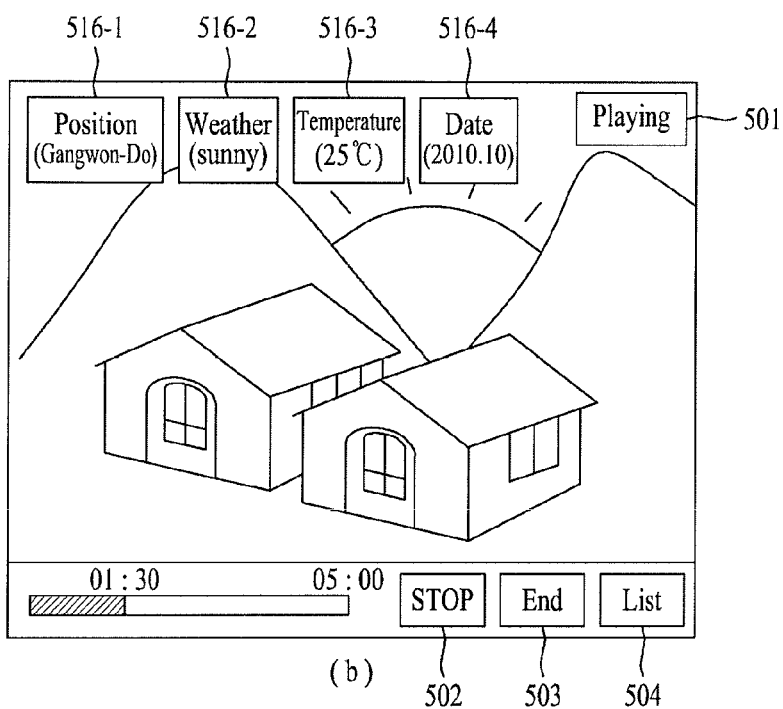

Referring to FIG. 5C, when a plurality of metadata are set on a currently output part, the mobile terminal 100 displays individual indication icons 515-1 to 515-4 and also displays a type of the corresponding metadata for each of the individual icons 515-1 to 515-4 (FIG. 5C(a)). Alternatively, the mobile terminal 100 displays individual indication icons 516-1 to 516-4 and is also able to display a type and schematic information of the corresponding metadata for each of the individual indication icons 516-1 to 516-4 (FIG. 5C(b)).

In this instance, the schematic information of the metadata is not whole information corresponding to the metadata but can include partial information in the whole information. For instance, when the whole information is 'Seorak Mountain, Buk-Myeon, Inje-Gun, Gangwon-Do', the schematic information can include 'Gangwon-Do'. In another instance, when the whole information is 'P.M. 10:00, Oct. 10, 2010', the schematic information can include 'October, 2010'.

Figure 5D:
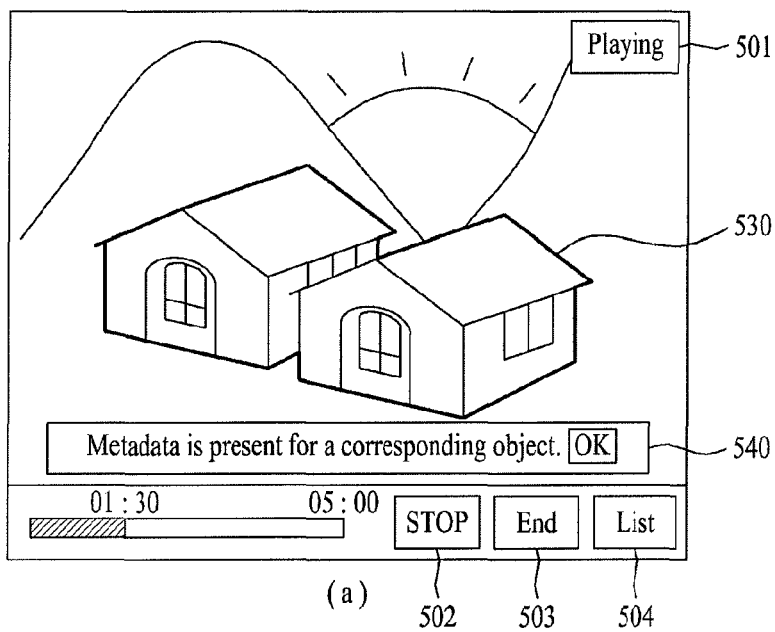
Figure 5D:
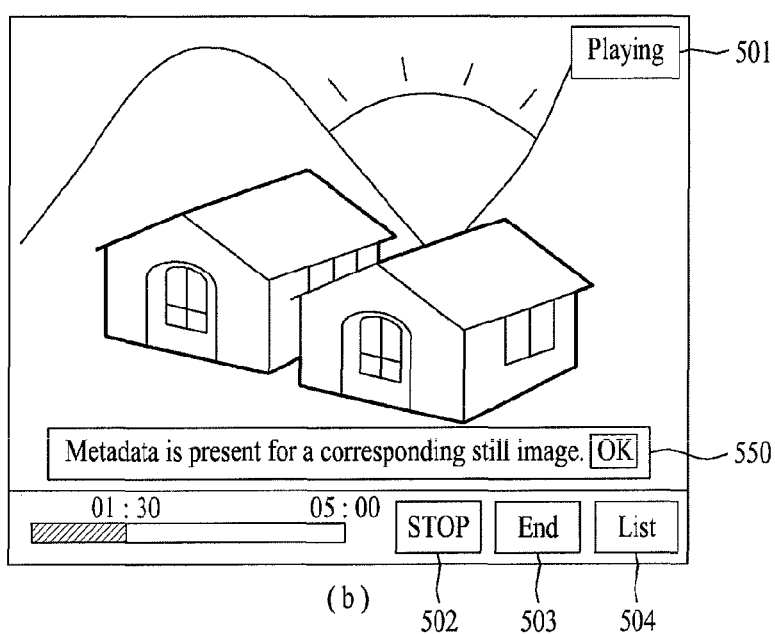

Referring to FIG. 5D, when metadata is set on a specific object 530 corresponding to a currently output part, the mobile terminal 100 identifiably displays the specific object 530 and also displays a text 540, which indicates that the metadata is present at the specific object 530, on a prescribed region of the screen (FIG. 5D(a)). When metadata is set on a specific still image (or a specific partial video) corresponding to a currently output part, the mobile terminal 100 can display a text 550, which indicates that the metadata is present at the specific still image (or the specific partial video), on a prescribed region of the screen.

In this instance, the mobile terminal 100 can output an audio or voice, which indicates that the metadata is present at the specific object or the specific still image, in addition to or instead of the display of the indication text 540 or 550.

Referring back to FIG. 3, in the outputting step S320, the mobile terminal 100 receives a selection action on a specific point of the screen in the course of outputting the video (S310) using the user input unit 130 and can then output metadata indication information, which indicates that the metadata is present, for at least one of an object corresponding to the specific point, a still image output at a timing point of the reception of the selection action and a partial video output at the timing point of the reception of the selection action as metadata-related information. Moreover, the metadata indication information can be displayed at the input point of the selection action.

For instance, the selection action on the specific point can include a touch action on the specific point.

Occasionally, the mobile terminal 100 skips the metadata-related information outputting process and is directly output the metadata set on the at least one of the object corresponding to the specific point, the still image output at the timing point of the reception of the selection action and the partial video output at the timing point of the reception of the selection action. For instance, if a size of the metadata is not considerable, the metadata-related information outputting process is skipped and the corresponding metadata is directly output.

If the metadata is not present, the metadata indication information is not output or information indicating the non-presence of the metadata can be output.

In the following description, a process for outputting metadata indication information as metadata-related information is explained with reference to FIG. 7A. For clarity and convenience of the following description, assume a video play state or a video output state. Note that descriptions of FIGS. 6A-6D are provided later.

Figure 7A:
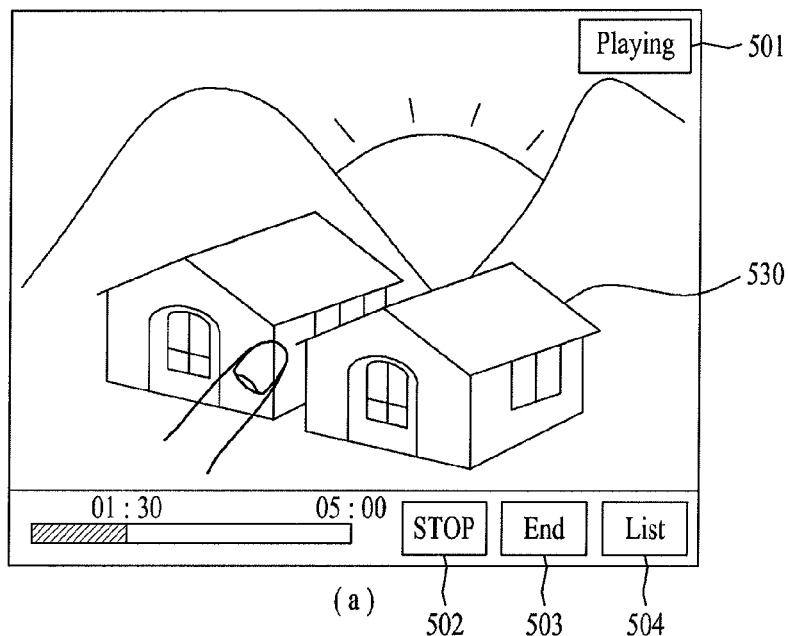
FIGS. 7A to 7C are diagrams for outputting metadata-related information and a corresponding metadata to correspond to a user selection action input in the course of outputting a video according to an embodiment of the present invention.
Figure 7A:
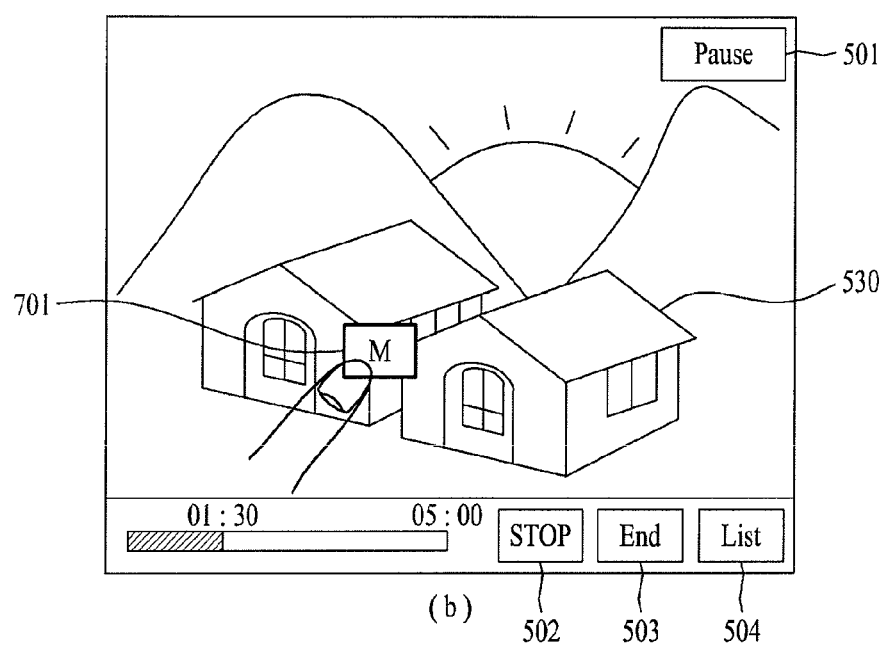

Referring to FIG. 7A, the mobile terminal 100 receives a touch action on a specific point of the screen in the course of playing a video (FIG. 7A(a)) and can then display an indication icon 701 as metadata indication information, which indicates that metadata is present, for at least one of an object having the specific point belong thereto, a still image output at a timing point of the reception of the touch action and a partial video output at the timing point of the reception of the touch action (FIG. 7A(b)). In this instance, the indication icon 701 can be displayed at the specific point.

Moreover, if the metadata is set on the specific point belonging object, the mobile terminal 100 can identifiably display the specific point belonging object.

Moreover, a type or schematic information of the set metadata can be further displayed within or together with the indication icon 701.

Meanwhile, if the metadata is not set on any one of the specific point belonging object, the still image output at the touch action received timing point and the partial video output at the touch action received timing point, the mobile terminal 100 does not display the indication icon 701 or can output metadata unset indication information.

Referring now to FIG. 3, in the outputting step S320, the mobile terminal 100 can output at least one of an integrated metadata indication bar for a metadata set on a whole video and an individual metadata indication bar for a metadata set on each of at least one or more objects included in the video, as metadata-related information.

In this instance, the bar is just one example of the embodiment. In addition, any display feature for identifiably displaying a specific part of a whole video can be substituted for the bar.

The integrated metadata indication bar or the individual metadata indication bar can perform a function of indicating a play progress extent of a video under the control of the controller 180. Hence, a user can confirm information on a currently played size and a currently non-played size of the whole video as well as information on a total size of the video using the integrated metadata indication bar or the individual metadata indication bar.

The mobile terminal 100 identifiably displays a metadata-present part of the whole video on the integrated metadata indication bar under the control of the controller 180 and can then display at least one of the number or type of the metadata present at the identifiably displayed part and the number or type of the metadata present object(s) in the identifiably displayed part under the control of the controller 180.

In particular, an identifiably display pattern can vary in accordance with the type or number of the metadata present at the identifiably displayed part. In addition, the identifiably display pattern can vary in accordance with the number or type of the metadata present object(s) in the identifiably displayed part. For instance, a display color can vary in accordance with the metadata type or the object type. In addition, a thickness level of a corresponding part can vary in accordance with the metadata number or the object number.

The mobile terminal 100 identifiably displays a part having a corresponding object included therein on the individual metadata indication bar and can display at least one of the number of the metadata present at the identifiably displayed part for the corresponding object and the type of the corresponding metadata, under the control of the controller 180.

In particular, the individual metadata indication bar can vary a display pattern in accordance with a corresponding object (e.g., a color difference, a shape difference, a position difference, etc.) and is also able to vary a display pattern in accordance with the number or type of the metadata present at the corresponding object.

Moreover, when at least one metadata having at least one metadata type for a video is set, the mobile terminal 100 can output an individual metadata indication bar corresponding to each of the at least one metadata type as metadata-related information.

For instance, when the types of the metadata set for a video are a position, a temperature and a comment, the mobile terminal 100 can output an individual metadata indication bar corresponding to each of the position, the temperature and the comment.

In the following description, a process for displaying an integrated metadata indication bar or an individual metadata indication bar as metadata-related information is explained with reference to FIGS. 8A to 10E. For clarity and convenience of the following description, assume a video play state or a video output state.

Figure 7B:
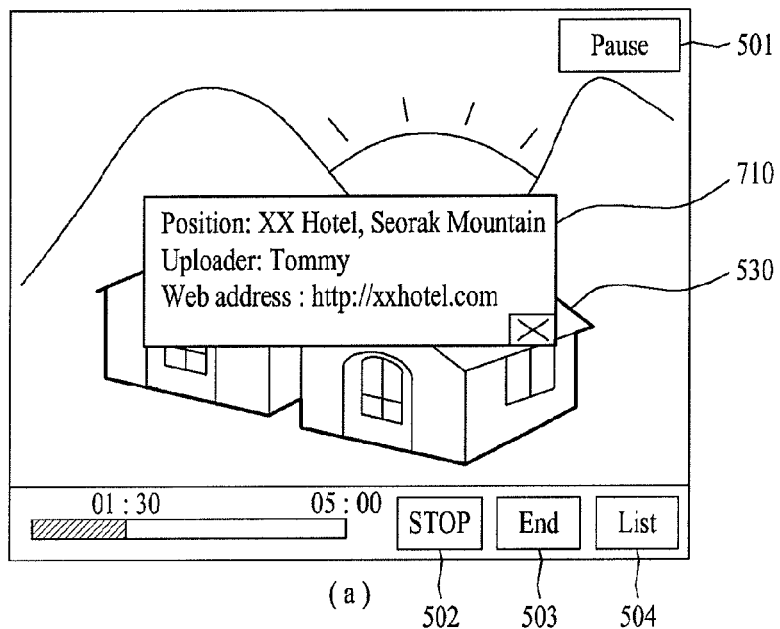
Figure 7B:
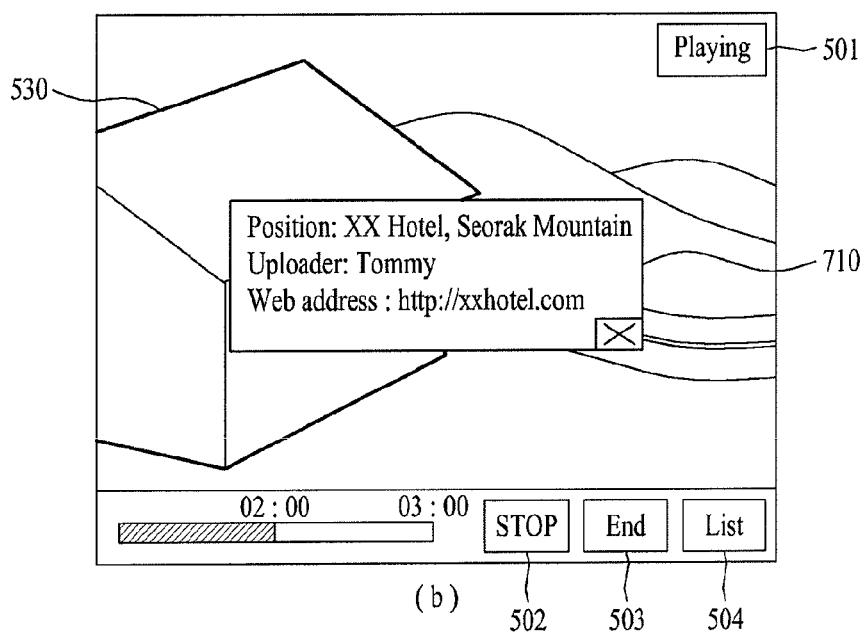
Figure 7C:
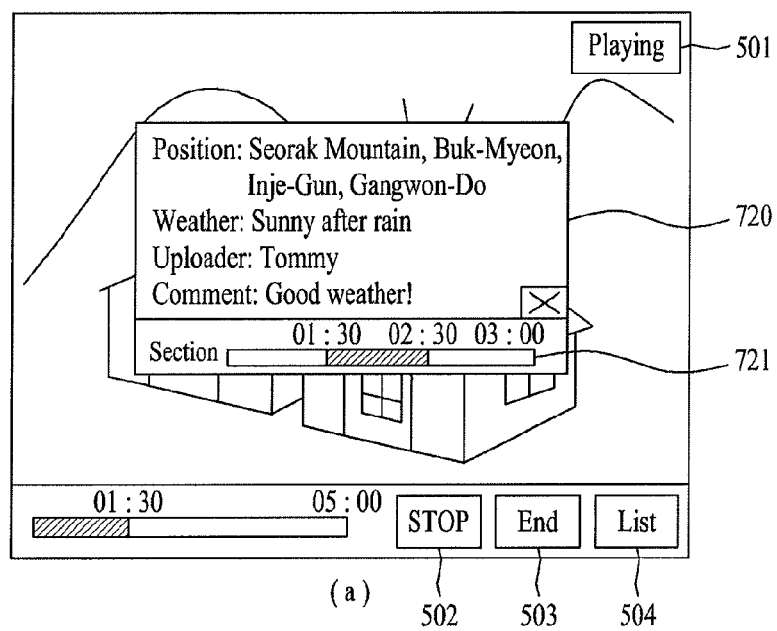
Figure 7C:
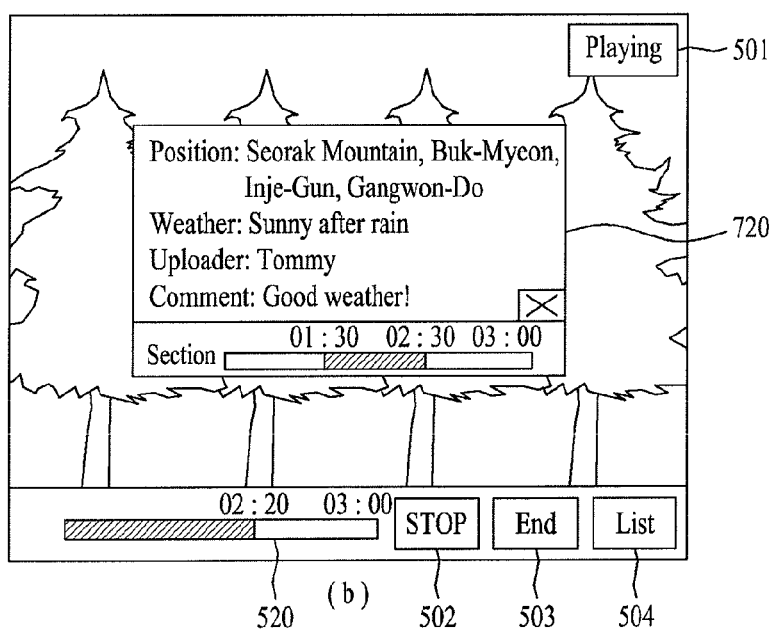
Figure 8:
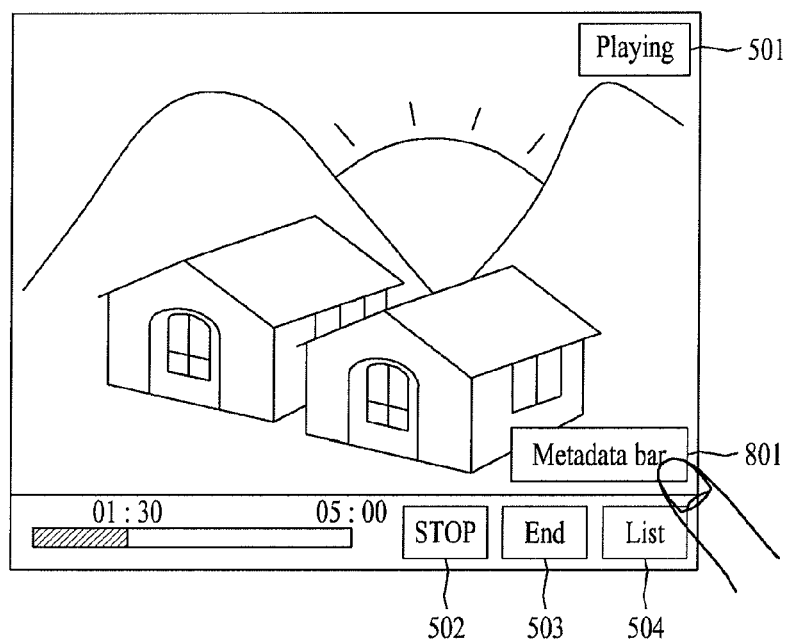
FIGS. 8 to 9D are diagrams for displaying an integrated metadata indication bar in the course of outputting a video according to an embodiment of the present invention.
Figure 9A:
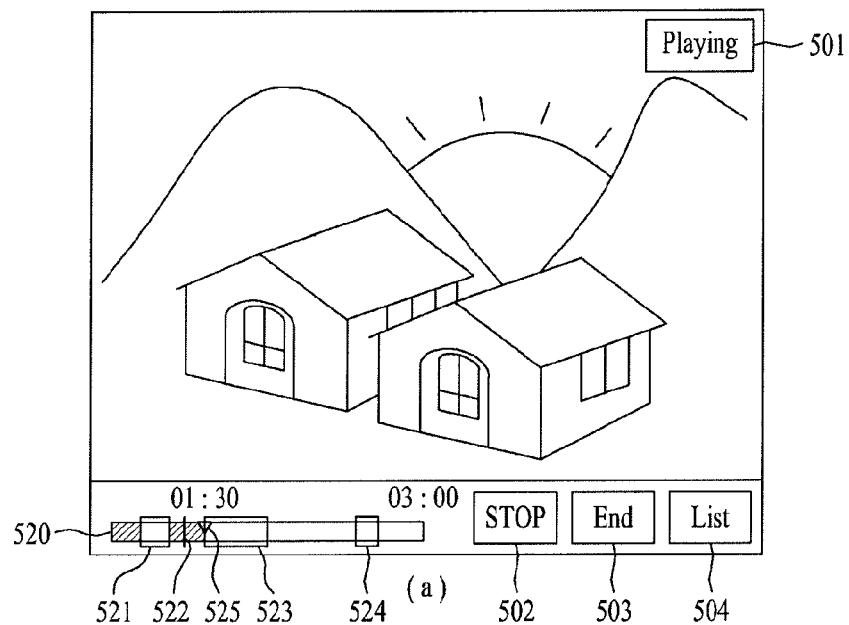
Figure 9A:
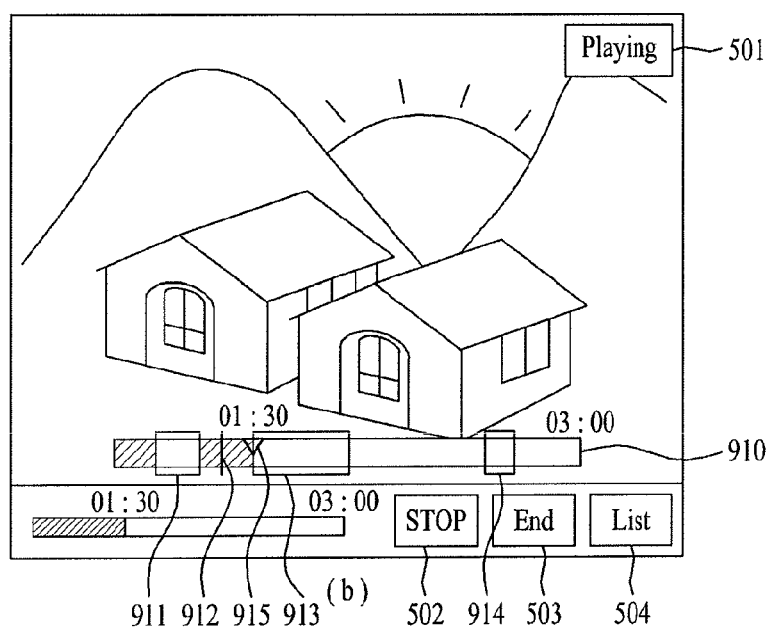
Figure 9B:
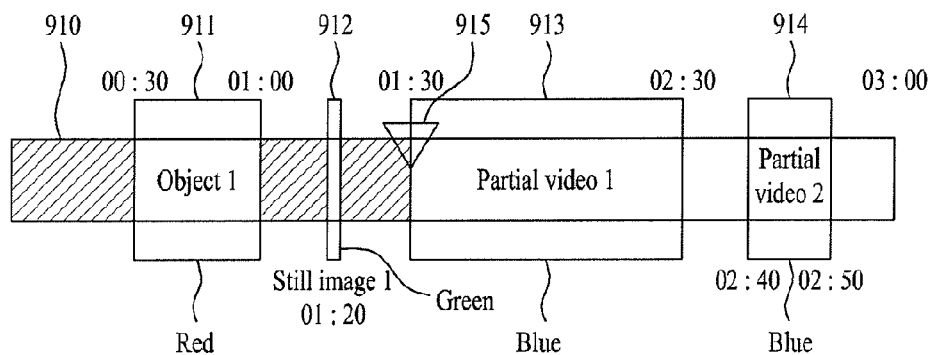
Figure 9B:
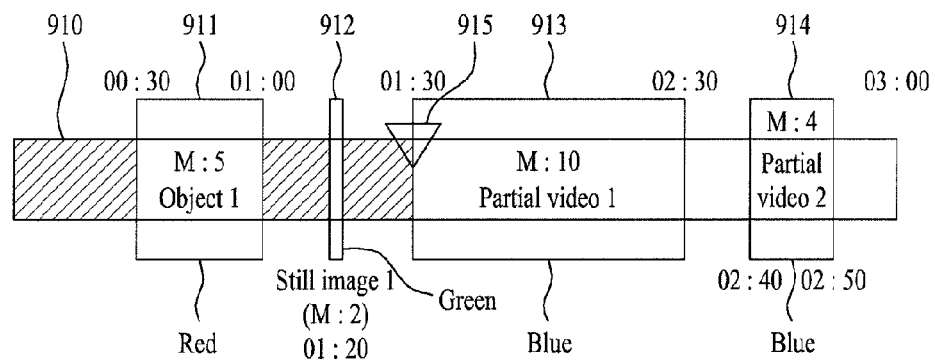
Figure 9C:
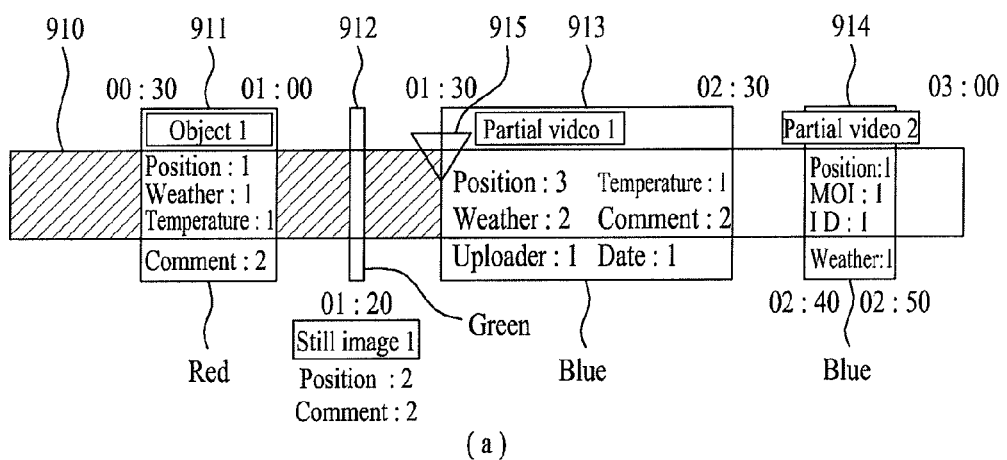
Figure 9C:
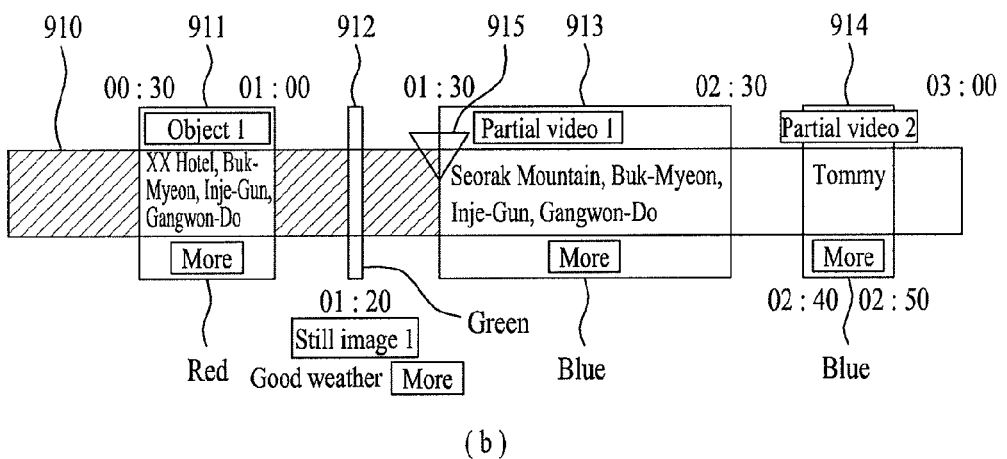
Figure 9D:
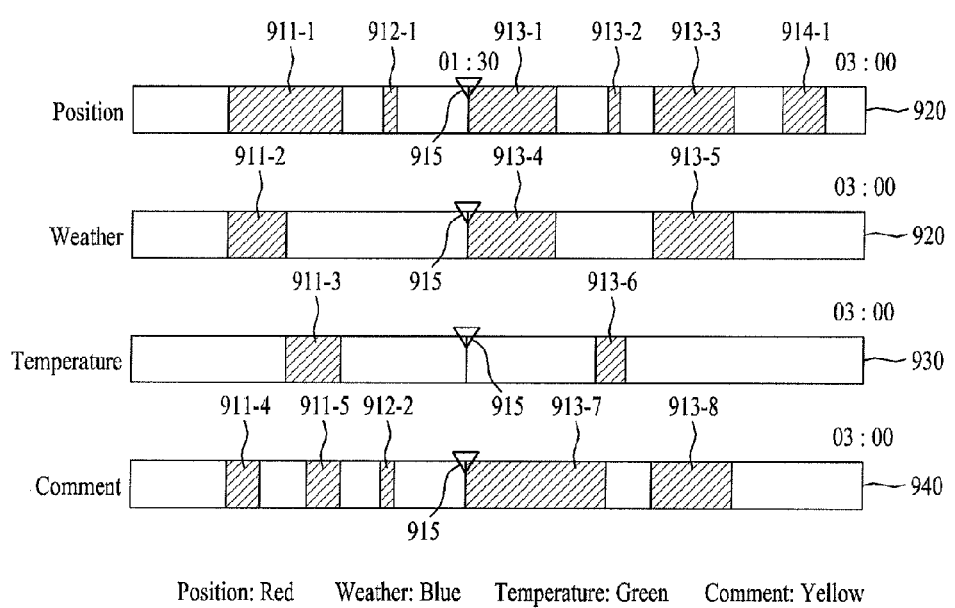

Next, FIGS. 8 to 9D are diagrams for displaying an integrated metadata indication bar in the course of outputting a video according to an embodiment of the present invention. In addition, FIGS. 10A to 10E are diagrams for displaying an individual metadata indication bar in the course of outputting a video according to an embodiment of the present invention. FIGS. 7B and 7C are discussed later.

Referring to FIG. 8, when receiving an input of a user touch action on a key zone (metadata bar) 801 provided to a prescribed region of the screen in the course of playing a video, the mobile terminal 100 can set a display state of a metadata indication bar.

In particular, the display state of the metadata indication bar can be set by one of a selection of a menu item corresponding to a metadata display command, a manipulation of a button key, a terminal motion detection, a voice input and the like.

The mobile terminal 100 can receive a command for displaying either an integrated metadata indication bar or an individual metadata indication bar shown in FIG. 8 from a user and can then display either the integrated metadata indication bar or the individual metadata indication bar in accordance with the command.

FIGS. 9A to 9D show that an integrated metadata indication bar is displayed. Referring to FIG. 9A, the mobile terminal 100 identifiably displays a plurality of zones 521 to 524 respectively corresponding to metadata present parts on an indication bar 520 indicating a video play extent without having a separate integrated metadata indication bar (FIG. 9A(a)). Alternatively, the mobile terminal 100 includes a separate integrated metadata indication bar 910 and can identifiably display zones 911 to 914 corresponding to a metadata-present part on the integrated metadata indication bar 910 (FIG. 9A(b)).

In particular, referring to FIG. 9A(b), the whole section of the integrated metadata indication bar 910 indicates a total video. A part represented as black (diagonal lines) in the whole section indicates a section played back so far. In addition, a part represented as white can indicate a section to be played back. Moreover, it can provide a position of a currently played part using a current position indicator 915.

In the following description, a detailed configuration of the integrated metadata indication bar 910 is explained. Referring to FIGS. 9B and 9C, a plurality of zones 911 to 914 respectively corresponding to metadata present parts in a whole video can be identifiably displayed on the integrated metadata indication bar 910. Similar comments apply to reference numerals 521-524 in FIG. 9A.

In particular, the first zone 911 indicates that metadata is set on a specific object included in the corresponding part (Object 1). The second zone 912 indicates that metadata is set on a specific still image included in the corresponding part (Still image 1). The third zone 913 indicates that metadata is set on a first partial video included in the corresponding part (Partial video 1). In addition, the fourth zone 914 indicates that metadata is set on a second partial video included in the corresponding part (Partial video 2).

Moreover, on the integrated metadata indication bar 910, time information on each of the first to fourth zones 911 to 914 can be further displayed. In this instance, the time information can include information on a play start point and a play end point (or a play time) off the part included in the corresponding zone of the whole video.

On the integrated metadata indication bar 910, each of the first to fourth zones 911 to 914 can have a zone size proportional to a play time (or the number of frames) of the corresponding part.

In particular, referring to FIG. 9B(a), at least one of a color, a shape, a size and the like of the corresponding zone can be differentiated in accordance with whether the corresponding part relates to an object, a still image or a partial video. In more detail, a display strength (level) can be differentiated in accordance with the number of metadata corresponding to the zone.

For instance, the first zone 911 corresponding to the object can be represented as red. The second zone 912 corresponding to the still image can be represented as green. In addition, the third zone 913 corresponding to the partial video can be represented as blue. When the number of the metadata is 5, the thickness of the first zone 911 is set to Level 5. When the number of the metadata is 2, the thickness of the second zone 912 is set to Level 2. When the number of the metadata is 10, the thickness of the third zone 913 is set to Level 10. When the number of the metadata is 4, the thickness of the fourth zone 914 is set to Level 4. Thus, the higher the level gets, the greater the thickness becomes.

Referring to FIG. 9B(b), it can display the number of a metadata set on the part corresponding to each of the first to fourth zones 911 to 914 can be displayed within the corresponding zone. For instance, the first zone 911 can display that 5 metadata are set (M:5). The second zone 912 can display that 2 metadata are set (M:2). The third zone 913 can display that 10 metadata are set (M:10). In addition, the fourth zone 914 can display that 4 metadata are set (M:4).

Referring to FIG. 9C(a), it can display the number per type for the metadata set on the corresponding part within each of the first to fourth zones 911 to 914. For instance, the first zone 911 can display that 1 position, 1 weather, 1 temperature and 2 comments are set. The second zone 912 can display that 1 position and 1 comment are set. The third zone 913 can display that 3 positions, 1 temperature, 2 comments, 1 uploader and 1 weather are set. In addition, the fourth zone 914 can display that 1 position, 1 MOI, 1 ID and 1 date are set.

Referring to FIG. 9C(b), a representative one of a plurality of a metadata set on the corresponding part can be displayed within each of the first to fourth zones 911 to 914. For instance, as representative metadata, the position information 'XX hotel, Buk-Myeon, Inje-Gun, Gangwon-Do' can be displayed within the first zone 911. The comment information 'good weather' can be displayed within the second zone 912. The position information 'Seorak Mountain, Buk-Myeon, Inje-Gun, Gangwon-Do' can be displayed within the third zone 913. In addition, the ID 'Tommy' can be displayed within the fourth zone 914. Moreover, if a zone 'more' provided to the corresponding zone is selected, the metadata set on the corresponding part can be displayed.

Besides, the metadata itself set on the corresponding part or the schematic information can be displayed within each of the first to fourth zones 911 to 914 (not shown in the drawing).

Referring to FIG. 9D, it can display a metadata indication bar per type of a metadata set for a whole video. If the number of types of a metadata set for the whole video is N, it can provide N metadata type_metadata indication bars. Alternatively, it can provide only a specific metadata type_metadata indication bar selected by a user from the N metadata type_metadata indication bars.

Referring to FIG. 9D, the mobile terminal 100 can display a position_metadata indication bar 920, a weather_metadata indication bar 930, a temperature_metadata indication bar 940 and a comment_metadata indication bar 950, respectively. Moreover, the mobile terminal 100 can represent the position_metadata indication bar 920, the weather_metadata indication bar 930, the temperature_metadata indication bar 940 and the comment_metadata indication bar 950 as red, blue, green and yellow, respectively, in accordance with a display color per type.

For instance, the zones 911-1, 912-1, 913-1, 913-2, 913-3 and 914-1 corresponding to the parts, of which metadata type is 'position', are identifiably displayed within the position_metadata indication bar 920. The zones 911-2, 913-4 and 913-5 corresponding to the parts, of which metadata type is 'weather', are identifiably displayed within the weather_metadata indication bar 930. The zones 911-3 and 913-6 corresponding to the parts, of which metadata type is 'temperature', are identifiably displayed within the temperature_metadata indication bar 940. In addition, the zones 911-4, 911-5, 912-2, 913-7 and 913-8 corresponding to the parts, of which metadata type is 'comment', are identifiably displayed within the comment_ metadata indication bar 950.

Meanwhile, although one metadata indication bar is set on one metadata type in the drawing, one metadata indication bar can be set on a plurality of metadata types.

Figure 10A:
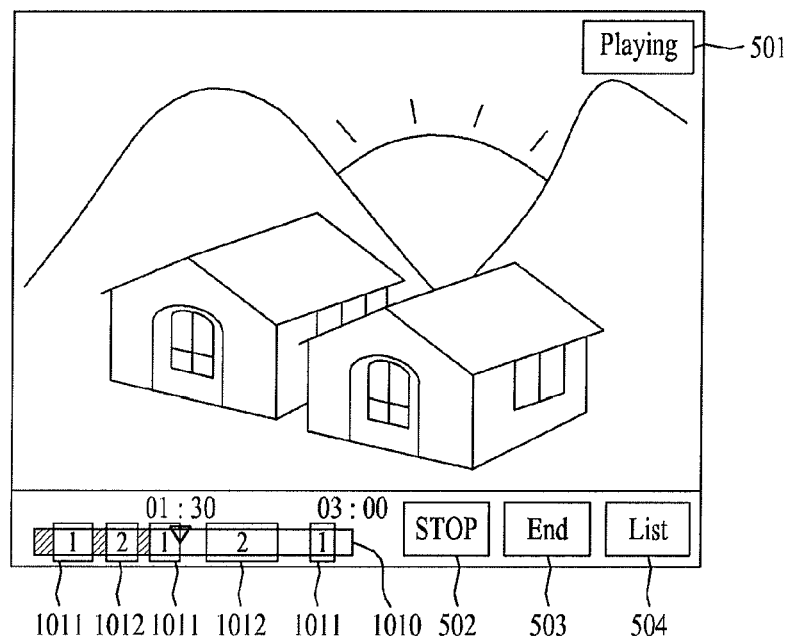
FIGS. 10A to 10E are diagrams for displaying an individual metadata indication bar in the course of outputting a video according to an embodiment of the present invention.

FIGS. 10A to 10E shows that individual metadata indication bars are displayed. Referring to FIG. 10A, the mobile terminal 100 is not separately provided with an individual metadata indication bar but can identifiably display zones 1011 and 1012, each of which corresponds to the part having a metadata set thereon, on an indication bar 1010 indicating a video play extent. In particular, FIG. 10C(a) shows that the indication bar 1010 is displayed in a manner of being enlarged.

When metadata are set on a first object and a second object, it can identifiably display the first zone 1011 corresponding to the first object and the second zone 1012 corresponding to the second object. For instance, the first zone 1011 and the second zone 1012 can be set to differ from each other in a display color (e.g., red, blue), a display shape, or a thickness level.

Figure 10B:
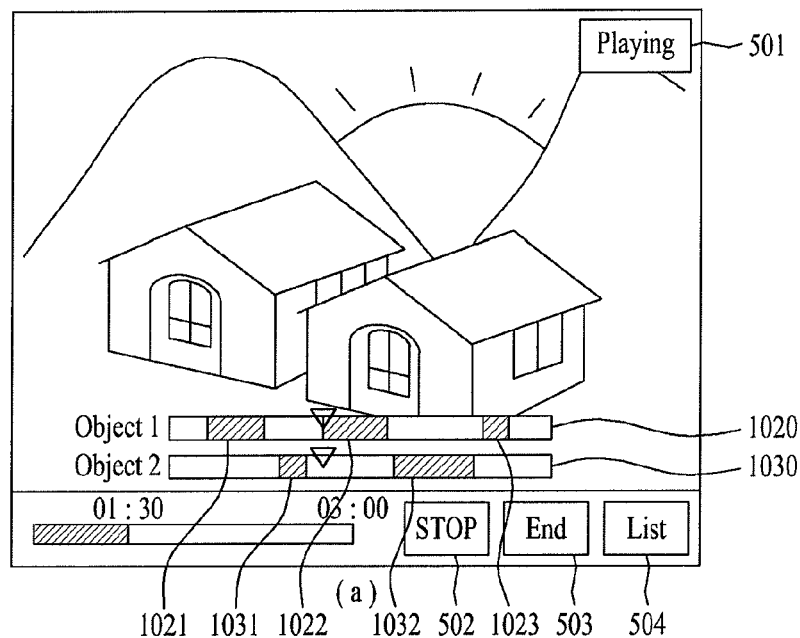
Figure 10B:
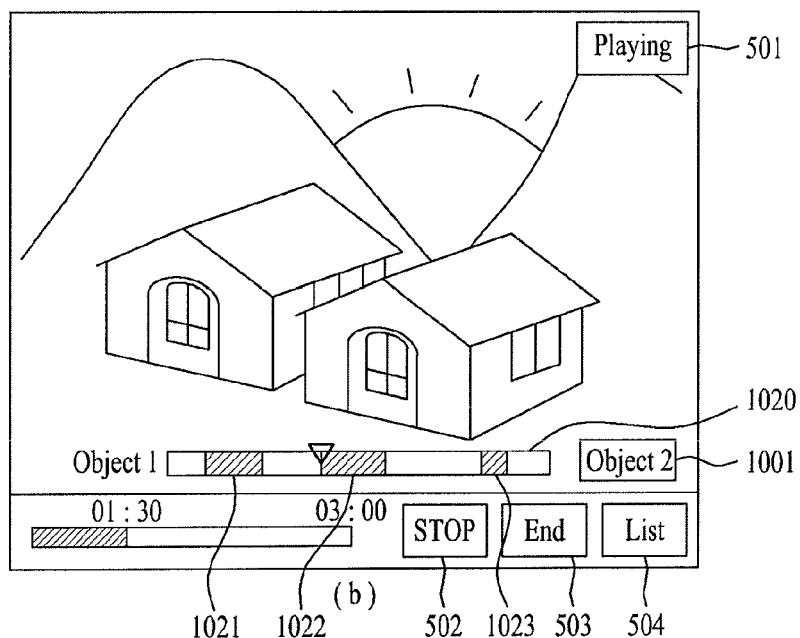

Referring to FIG. 10B, assuming that there are two metadata-set objects (i.e., a first object Object 1 and a second object Object 2), the mobile terminal 100 includes a first individual metadata indication bar 1020 and a second individual metadata indication bar 1030. The mobile terminal 100 can then identifiably display the zones 1021 to 1023 corresponding to the metadata present part and the zones 1031 and 1032 corresponding to the metadata present part on the first individual metadata indication bar 1020 and the second individual metadata indication bar 1030, respectively (FIG. 10B (a)).

Alternatively, the mobile terminal 100 displays the first individual metadata indication bar 1020 and can be provided with an object 2 zone 1001 for receiving an input of a display command signal of the second individual metadata indication bar 1030 (FIG. 10B(b)).

When receiving an input of a touch action on the object 2 zone 1001 in FIG. 10(*b*), the mobile terminal 100 can switch to display the second individual metadata indication bar 1030. In this instance, an object 1 zone can be substituted for the object 2 zone 1001.

In particular, referring to FIG. 10B, a whole section of the individual metadata indication bar 1020 or 1030 indicates a whole video. A part represented as block in the whole section indicates a section played back so far. In addition, a part represented as white indicates a section to be played back. In addition, it can provide a position of a currently played part using a current position indicator (▼).

Figure 10C:
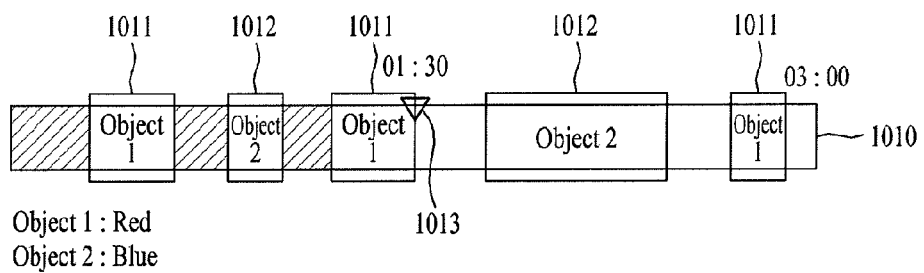
Figure 10C:
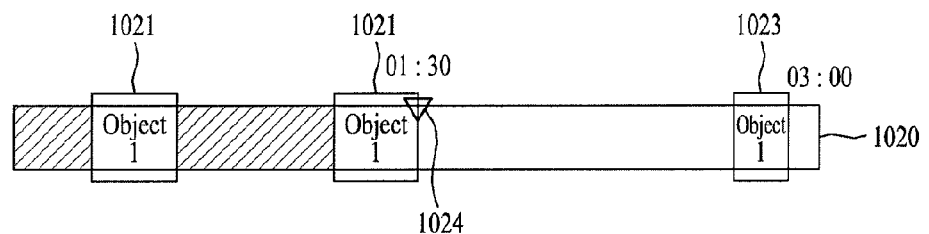
Figure 10C:
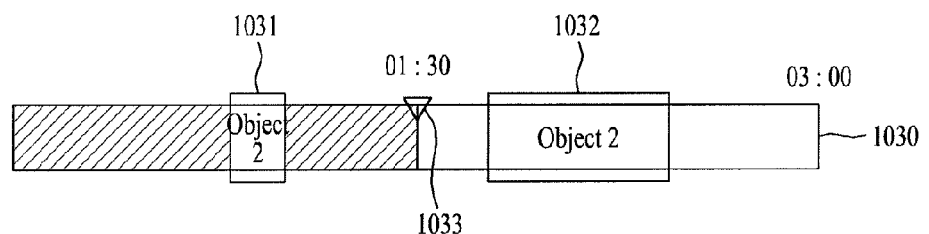

In more detail, FIG. 10C(b) shows that the first individual metadata indication bar 1020 and the second individual metadata indication bar 1030 are displayed in a manner of being enlarged.

In the following description, the detailed configurations of the individual metadata indication bars 1020 and 1030 are explained.

Figure 10D:
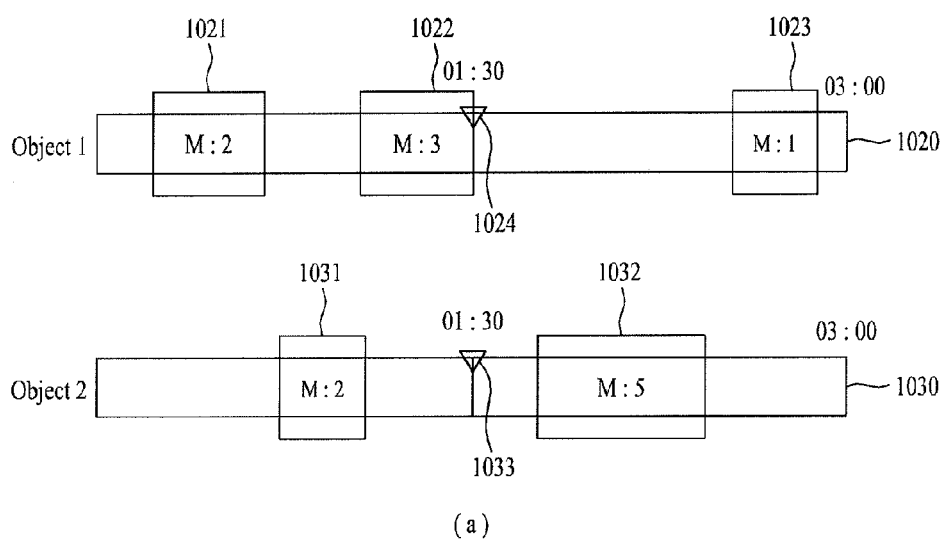
Figure 10D:
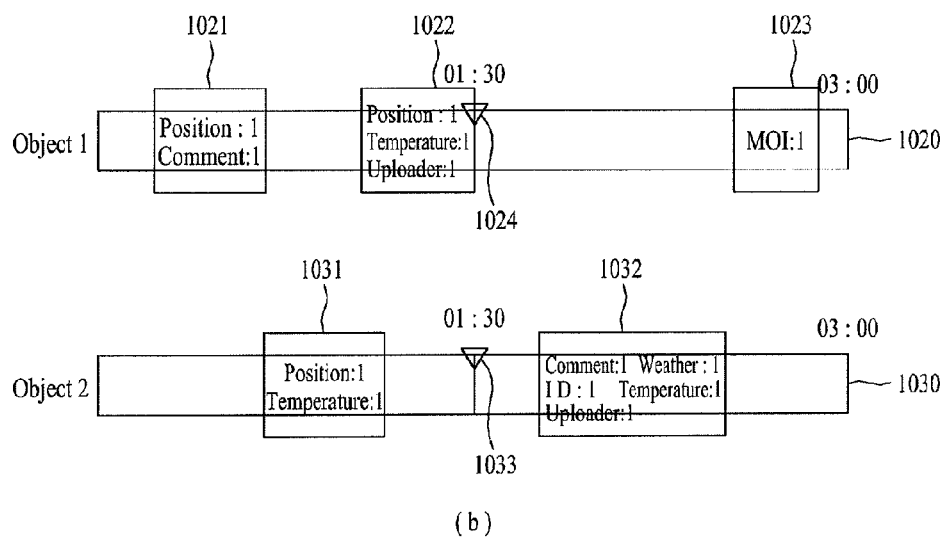
Figure 10E:
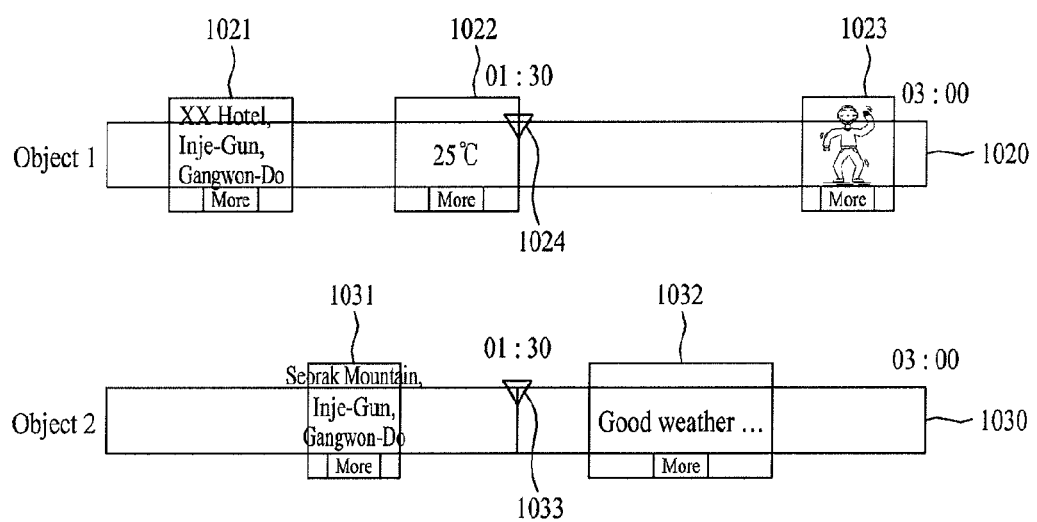

Referring to FIGS. 10D and 10E, zones 1021 to 1023 indicating the part corresponding to the metadata set first object are identifiably displayed on the first individual metadata indication bar 1020. In addition, zones 1031 and 1032 indicating the part corresponding to the metadata set second object are identifiably displayed on the second individual metadata indication bar 1030. Moreover, on each of the first and second individual metadata indication bars 1020 and 1030, time information on each of the included zones can be further displayed. In addition, a corresponding zone size can be set in proportion to the play time (or the number of frames) of the corresponding part.

In particular, referring to FIG. 10D(a), the number of the metadata set on the first object of the corresponding part is displayed within each of the zones 1021 to 1023 included in the first individual metadata indication bar 1020. In addition, the number of the metadata set on the second object of the corresponding part is displayed within each of the zones 1031 and 1032 included in the second individual metadata indication bar 1030.

Referring to FIG. 10D(b), the number of the per-type metadata set on the first object of the corresponding part is displayed within each of the zones 1021 to 1023 included in the first individual metadata indication bar 1020. In addition, the number of the per-type metadata set on the second object of the corresponding part is displayed within each of the zones 1031 and 1032 included in the second individual metadata indication bar 1030.

Referring to FIG. 10E, a representative one of a plurality of the metadata set on the first object of the corresponding part is displayed within each of the zones 1021 to 1023 included in the first individual metadata indication bar 1020. In addition, a representative one of a plurality of the metadata set on the second object of the corresponding part is displayed within each of the zones 1031 and 1032 included in the second individual metadata indication bar 1030.

Besides, the metadata itself or the schematic information (described) set on the first object of the corresponding part can be displayed within each of the zones 1021 to 1023 included in the first individual metadata indication bar 1020 (not shown in the drawing). In addition, the metadata itself or the schematic information (described) set on the second object of the corresponding part can be displayed within each of the zones 1031 and 1032 included in the second individual metadata indication bar 1030 (not shown in the drawing).

Furthermore, it can display the metadata set on the first or second object in a manner that a metadata indication bar is displayed per type (not shown in the drawing). Therefore, a user can confirm where the metadata of a specific type set on a specific object is set in a whole video.

Referring now to FIG. 3, the mobile terminal 100 receives an input of a selection action on the metadata-related information output in the outputting step S320 using the user input unit 130 (S330).

For instance, the selection action can include one of a selection action on metadata indication information and a selection action on a metadata-present part identifiably displayed in the integrated metadata indication bar or the individual metadata indication bar. In addition, the selection action can include a touch action on the metadata-related information.

The mobile terminal 100 outputs at least one metadata corresponding to the metadata-related information selected by the selection action using the output unit 150, under the control of the controller 180 (S340).

First of all, displaying metadata indication information as metadata-related information is described as follows.

In the following description, when metadata indication information is selected, a first process (cf. FIGS. 5A to 5D) for outputting a corresponding metadata is explained with reference to FIGS. 6A to 6C.

Figure 6A:
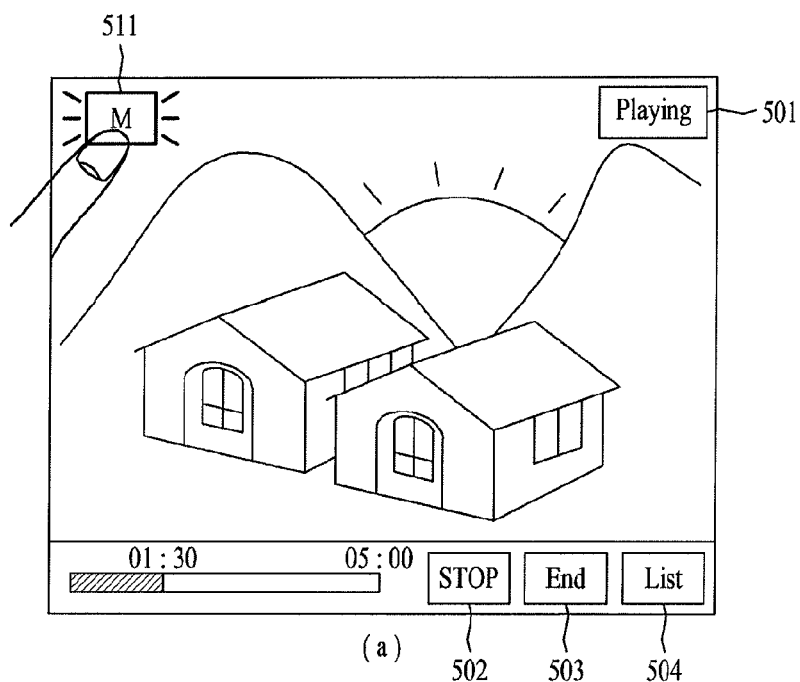
FIGS. 6A to 6C are diagrams for outputting a corresponding metadata, if metadata indication information is selected, according to an embodiment of the present invention.
Figure 6A:
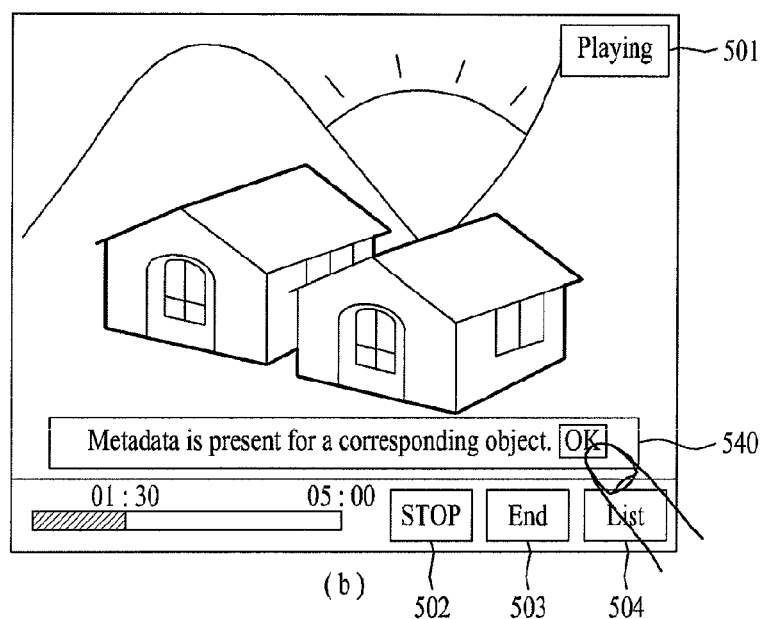
Figure 6B:
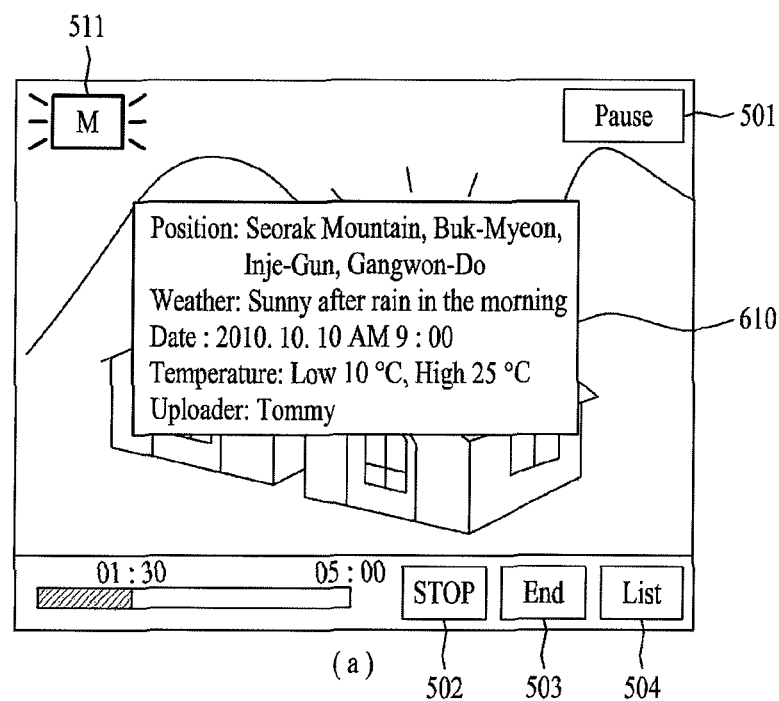
Figure 6B:
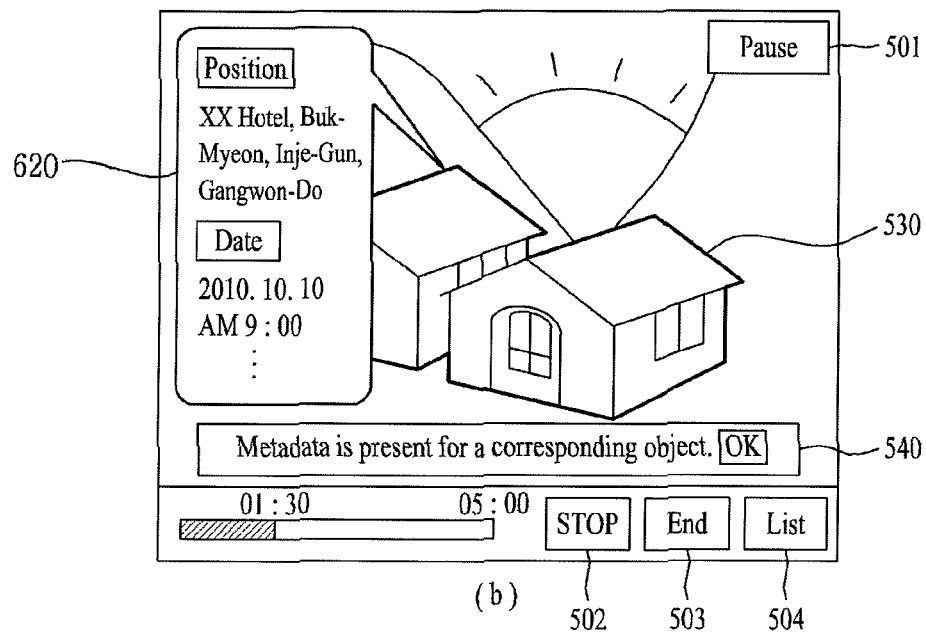
Figure 6C:
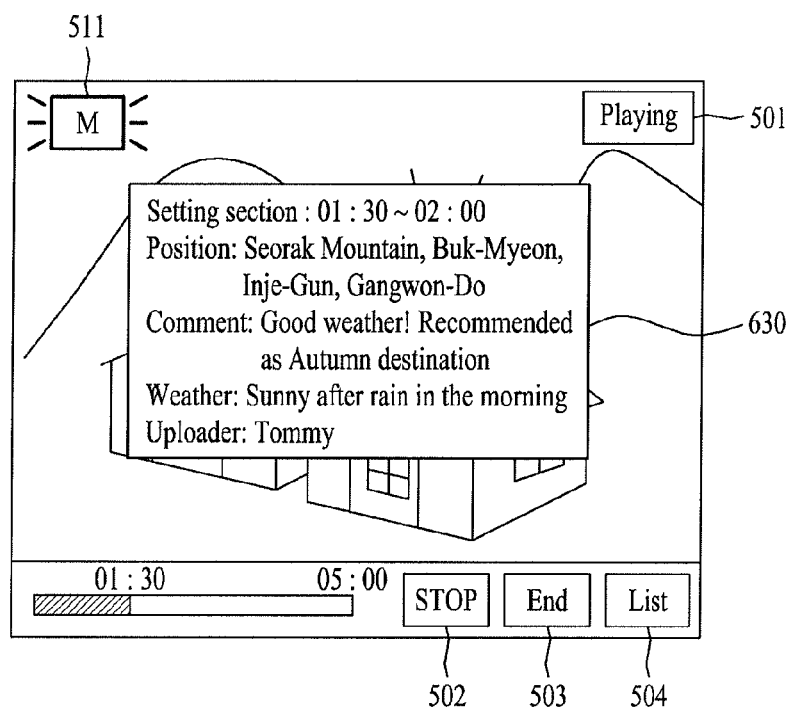

FIGS. 6A to 6C are diagrams for outputting a corresponding metadata, if metadata indication information is selected, according to an embodiment of the present invention.

Referring to FIG. 6A, when metadata is set on a currently output part in the course of playing a video, the mobile terminal 100 displays an indication icon 511 on a prescribed region of the screen (FIG. 6A(a)) or can display an indication text 540 on a prescribed region of the screen (FIG. 6A(b)).

Referring to FIG. 6B(a), when receiving a user touch action on the indication icon 511 in FIG. 6A(a) or a user touch action on the indication text 540 in FIG. 6A(b), the mobile terminal 100 can output the metadata 610 set on the part output at the timing point of the user touch action reception.

Referring to FIG. 6B(b), when receiving a user touch action on the indication icon 511 in FIG. 6A(a) or a user touch action on the indication text 540 in FIG. 6A(b), the mobile terminal 100 outputs the metadata 610 set on the part output at the timing point of the user touch action reception. In doing so, if the metadata 620 is set on a specific object 530, the mobile terminal 100 is also able to identifiably display the specific object 530 in a manner of linking the metadata 620 with the specific object 530.

Specifically, in FIG. 6B, the mobile terminal 100 can pause the video play automatically or in accordance with a user selection (501). Alternatively, the mobile terminal 100 partitions the screen into a plurality of regions including a first region and a second region. The mobile terminal 100 displays the output screen according to the video play on the first region. In addition, the mobile terminal 100 is also able to display a still image and metadata 610 or 620 corresponding to the part output at the timing point of the user touch action reception on the second region.

Referring to FIG. 6C, when receiving a user touch action on the indication icon 511 in FIG. 6A(a) or a user touch action on the indication text 540 in FIG. 6A(b), if metadata 630 is set on a partial video, the mobile terminal 100 does not pause the video play but can keep displaying the metadata 630 during the playback of the partial video.

In the following description, when metadata indication information is selected, a second process (cf. FIG. 7A) for outputting a corresponding metadata is explained with reference to FIGS. 7A to 7C.

Referring to FIG. 7A, when receiving a first touch action on a prescribed point of the screen in the course of playing a video (FIG. 7A(a)), the mobile terminal 100 displays an indication icon 701 and can then further receive a second touch action on the indication icon 701 from a user (FIG. 7A(b)).

Referring to FIG. 7B, when metadata 710 corresponding to the indication icon 701 is set on a specific object 530 to which the received point of the first touch action belongs, the mobile terminal 100 identifiably displays the specific object 530 in a manner of linking the metadata 710 with the specific object 530.

In particular, when the specific object 530 is included in all of a plurality of still images displayed during a predetermined play section, the identifiable display of the specific object 530 and the display of the metadata 710 can be continuously maintained during the predetermined play section.

Moreover, if the specific object 530 is included in a single still image only, the video play can be paused. If the specific object 530 is included in all of a plurality of the still images displayed during the predetermined play section, the video can continue to play seamlessly.

Referring to FIG. 7C, if the metadata 710 corresponding to the indication icon 701 is set on a partial video (having a predetermined play section) output at the timing point of the reception of the first touch action, the mobile terminal 100 can keep displaying the metadata 720 during the play section of the partial video.

Besides, even if the metadata keeps being displayed during a predetermined period of time, it can stop displaying the metadata at any time in accordance with a user selection.

Referring now to FIG. 3, when the metadata-related information is the integrated metadata indication bar or the individual metadata indication bar, if a selection action on an identifiably displayed part indicating that metadata is present is input, the mobile terminal 100 can output a video starting with a video part corresponding to the selection action received part.

In the following description, displaying a metadata indication bar as metadata-related information is explained.

First of all, if a user selection action on a metadata-present part in an integrated metadata indication bar is input, a process for changing a video play position and outputting the corresponding metadata is described with reference to FIGS. 11A to 11C as follows. For clarity and convenience of the following description, assume that the integrated metadata indication bar has the former configuration shown in FIG. 9B(b).

Figure 11A:
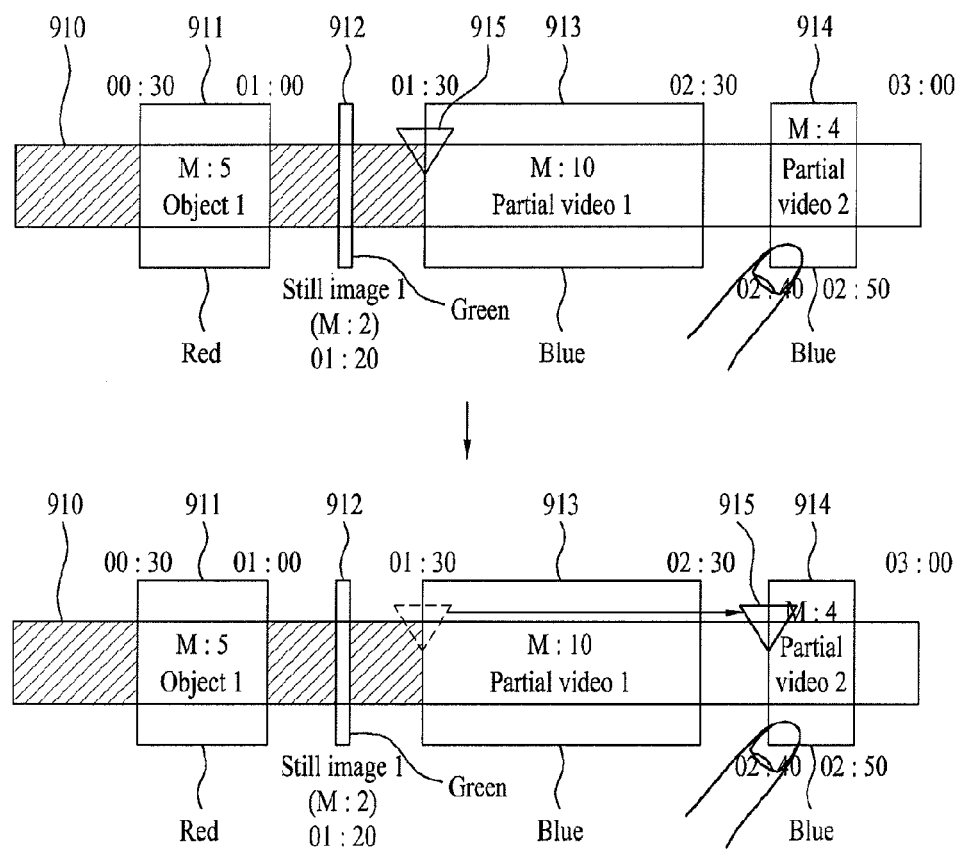
FIGS. 11A to 11C are diagrams for changing a video play position and outputting a corresponding metadata when receiving an input of a user selection action on a metadata-present part of an integrated metadata indication bar according to an embodiment of the present invention.
Figure 11B:
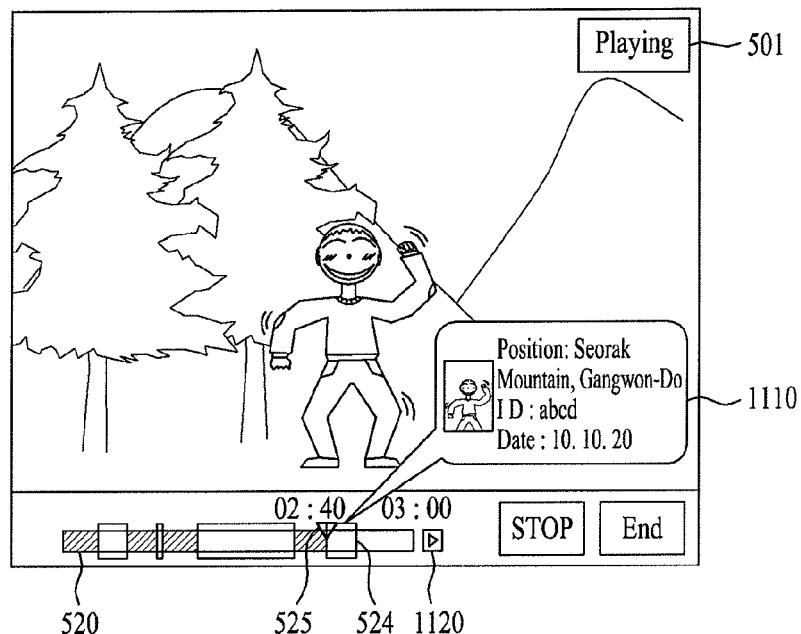
Figure 11C:
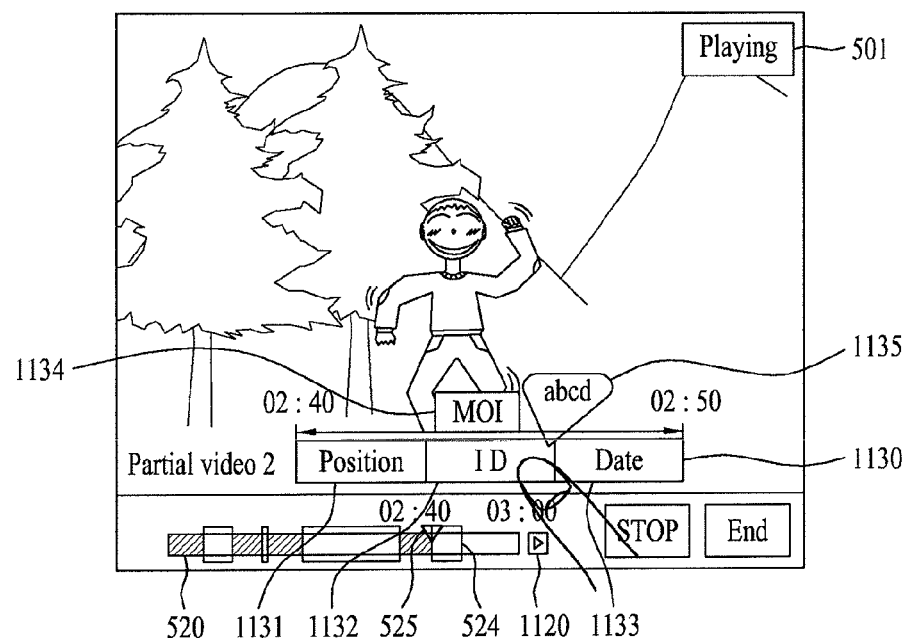

FIGS. 11A to 11C are diagrams for changing a video play position and outputting a corresponding metadata when receiving an input of a user selection action on a metadata-present part of an integrated metadata indication bar according to an embodiment of the present invention.

Referring to FIG. 11A, when receiving a touch action on a fourth zone 914 corresponding to a partial video 2 in the course of playing a video, the mobile terminal 100 shifts a current position indicator 915 to a start point (i.e., a point corresponding to 2 minutes and 40 seconds in a whole video) of the fourth zone 914 and can then play the video from a start timing point (or a random timing point) of the partial video 2 (i.e., 2 minutes 40 seconds to 2 minutes 50 seconds in the whole video) corresponding to the fourth zone 914. In this instance, the random timing point can be the timing point corresponding to the input point of the touch action on the fourth zone 914.

Referring to FIG. 11B, while the mobile terminal 100 plays the video from the start timing point of the partial video 2, the mobile terminal 100 can display the metadata 1110 set on the partial video 2. In doing so, the metadata 1110 is displayed in a manner of being linked with the fourth zone 914, is displayed at a random point of the screen, or can be displayed within the fourth zone 914.

Referring to FIG. 11C, while the mobile terminal 100 plays the video from the start timing point of the partial video 2, the mobile terminal 100 can display a metadata indication bar 1130 corresponding to the metadata set on the partial video 2. In particular, the metadata indication bar 1130 can identifiably display the metadata set specific sections 1131 to 1133 for the play section (i.e., 2 minutes 40 seconds to 2 minutes 50 seconds) of the partial video 2 and is also able to display a corresponding metadata type or a corresponding metadata itself within each of the specific sections 1131 to 1133. Moreover, when receiving an input of a user touch action on the specific section 1132 on which 'metadata type_ID' is displayed, the metadata indication bar 1130 can display a user ID 'abcd' 1134 that is the metadata corresponding to the specific section (ID) 1132.

In the following description, a process for changing a video play position and outputting a corresponding metadata when receiving an input of a user selection action on a metadata-present part of an individual metadata indication bar is explained with reference to FIGS. 12A to 12C. For clarity and convenience of the following description, assume that an individual metadata indication bar is the former first individual metadata indication bar 1020 shown in FIG. 10D(a).

Figure 12A:
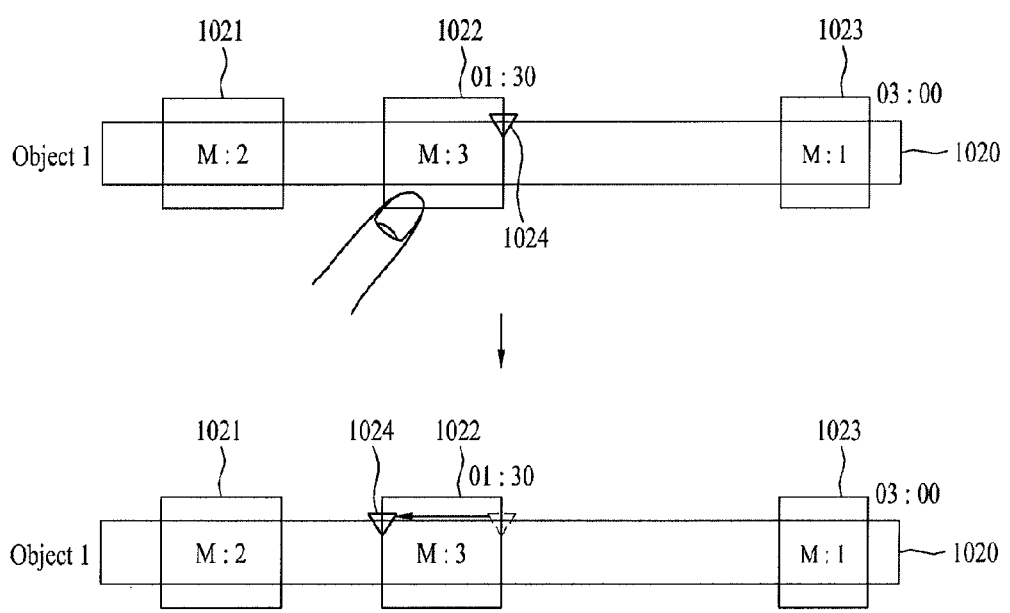
FIGS. 12A to 12C are diagrams for changing a video play position and outputting a corresponding metadata when receiving an input of a user selection action on a metadata-present part of an individual metadata indication bar according to an embodiment of the present invention.
Figure 12B:
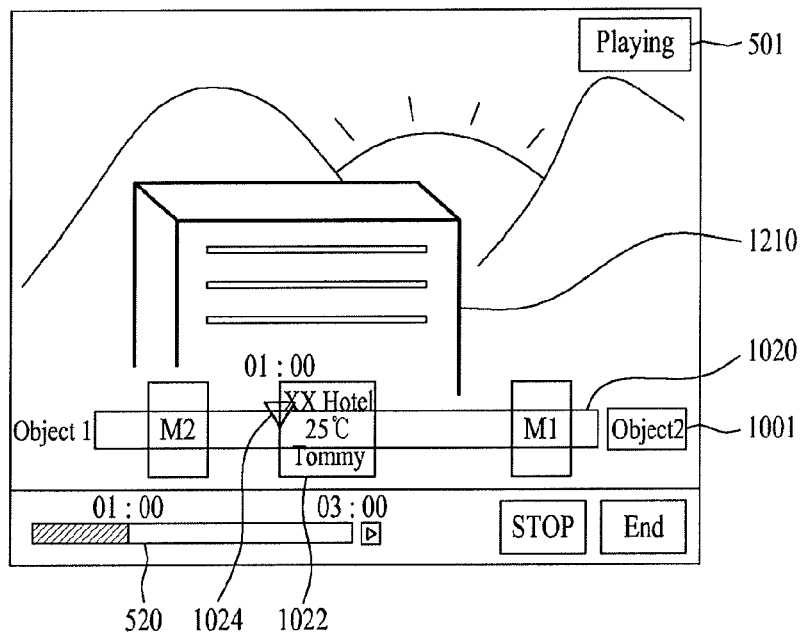
Figure 12C:
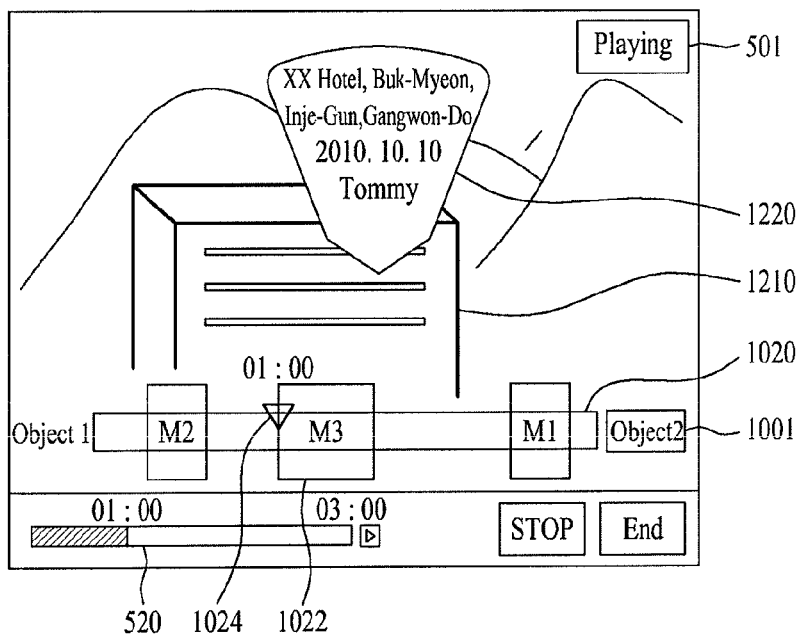

FIGS. 12A to 12C are diagrams for changing a video play position and outputting a corresponding metadata when receiving an input of a user selection action on a metadata-present part of an individual metadata indication bar according to an embodiment of the present invention.

Referring to FIG. 12A, when receiving an input of a touch action on a second zone 1022 within a first individual metadata indication bar 1020 in the course of playing a video, the mobile terminal 100 shifts a current position indicator 1024 to a start point (i.e., a point corresponding to 1 minute and 00 second in a whole video) of the second zone 1022 and can then play the video from a start timing point (or a random timing point) of a part (i.e., 1 minute 00 second to 1 minute 30 seconds in the whole video) corresponding to the second zone 1022. In this instance, the random timing point can be the timing point corresponding to the input point of the touch action on the second zone 1022.

Referring to FIGS. 12B and 12C, while the mobile terminal 100 plays the video from the start timing point of the part corresponding to the second zone 1022, the mobile terminal 100 can display the metadata 1110 set on a first object 1210 during the section (i.e., 1 minute 00 second to 1 minute 30 seconds in the whole video) corresponding to the second zone 1022. In doing so, the first object 1210 can be identifiably displayed during the section (i.e., 1 minute 00 second to 1 minute 30 seconds in the whole video) corresponding to the second zone 1022.

In particular, the metadata 1110 is displayed within the fourth zone 914 (FIG. 12B) or can be displayed in a manner of being linked with the fourth zone 914 (FIG. 12C).

Besides, a touch action on the first and second zones (i.e., example of a plurality of zones) disconnected from each other in the integrated metadata indication bar (or the individual metadata indication bar) can be input (not shown in the drawing). If so, the mobile terminal 100 can output the video corresponding to the part corresponding to the first zone and the video and metadata corresponding to the shifted part resulting from a shift to the second zone after the output of the metadata. In particular, the part between the first zone and the second zone may not be output.

According to an embodiment of the present invention, when metadata relating to a currently played video (particularly, an object, a still image or a partial video) is the user information (e.g., user ID, etc.) registered with a social network service (SNS), the mobile terminal 100 can output the data, which is transceived in association with the registered user information via the SNS, as metadata-related information under the control of the controller 180.

When the registered user information is set on a specific object included in the currently output video part, the mobile terminal 100 can display the data transceived in association with the registered user information for the specific object under the control of the controller 180.

For instance, the data transceived in association with the registered user information can include a text (or, image, file, URL information, etc.) input by a user corresponding to the registered user information, a reply to the input text and the like.

In particular, when receiving an input of a metadata output command signal or metadata-related information output command signal from a user in the course of playing a video, the mobile terminal 100 can confirm that the metadata corresponding to the currently played part is the user ID registered with the SNS. The mobile terminal 100 includes the data transceived in association with the registered user ID from the SNS server 1350 and can then display the provided data as the metadata-related information on the currently played part.

When receiving an input of a metadata output command signal or a metadata-related information output command signal for a specific object, the mobile terminal 100 confirms that the metadata corresponding to the specific object is the user ID registered with the SNS and can then display the data provided by the SNS server in a manner of linking the provided data with the specific object.

This is described with reference to FIGS. 13A to 13C. For clarity and convenience of the following description, assume that a user ID registered with SNS is registered as metadata for a specific object.

Figure 13A:
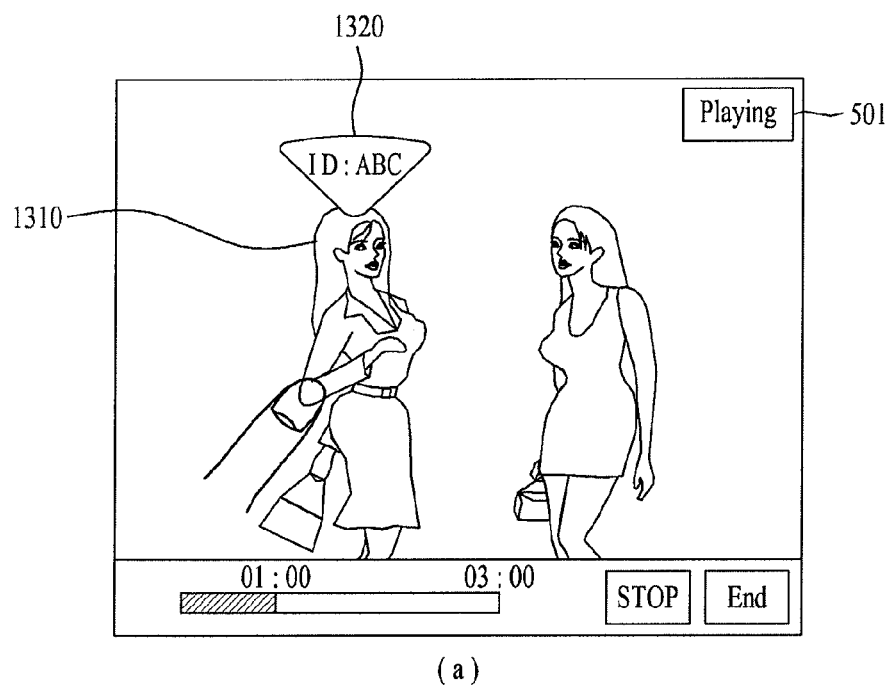
FIGS. 13A to 13C are diagrams for outputting data transceived in association with a user information together with a user information, if metadata is the user information registered with a social network service, according to an embodiment of the present invention.
Figure 13B:
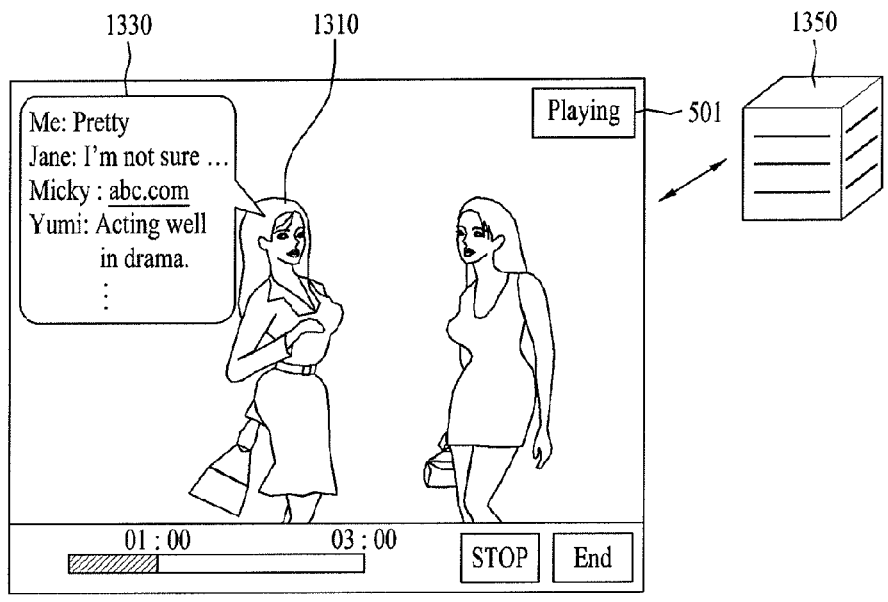
Figure 13B:
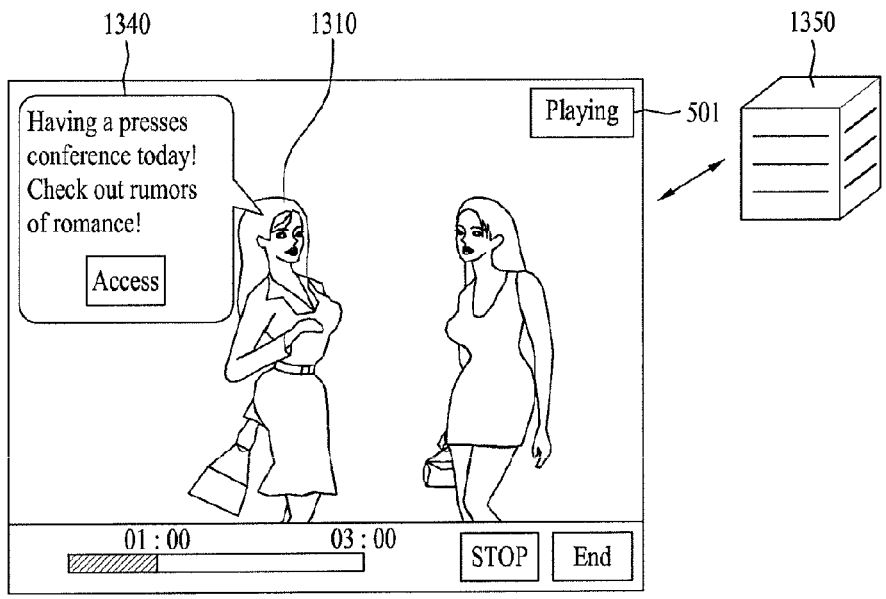
Figure 13C:
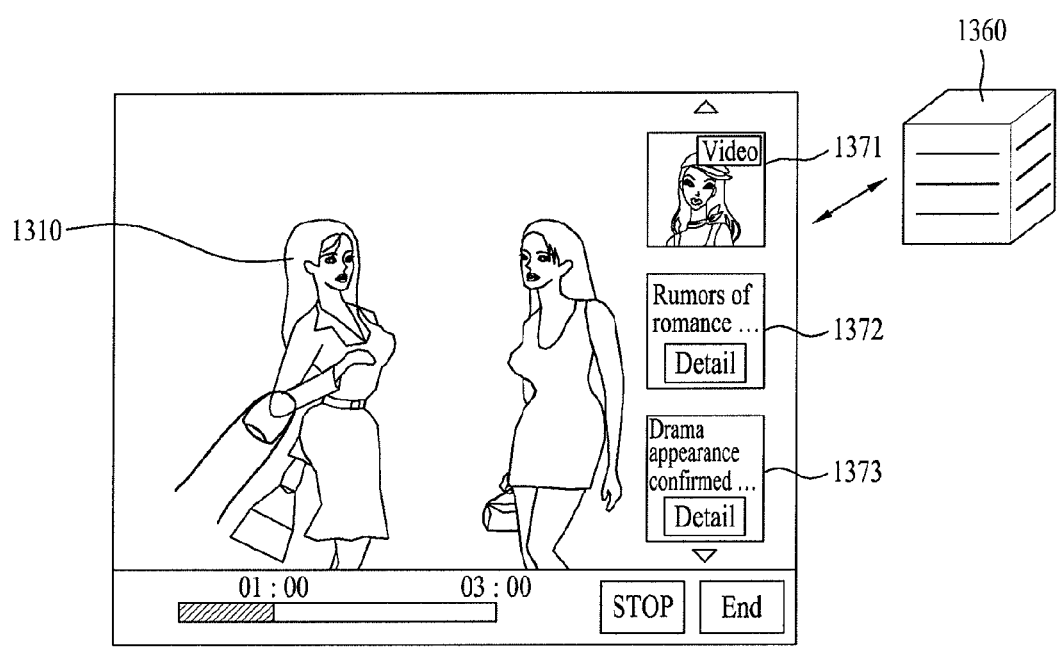

FIGS. 13A to 13C are diagrams for outputting data transceived in association with a user information together with a user information, if metadata is the user information registered with a social network service, according to an embodiment of the present invention.

Referring to FIG. 13A, when receiving an input of a user touch action on a specific object 1310 in the course of playing a video, the mobile terminal 100 can display the user ID 1320 set on the specific object 1310 as metadata-related information in a manner of linking the user ID 1320 with the specific object 1310.

Referring to FIG. 13B, when receiving an input of a user touch action on a specific object 1310 in the course of playing a video, the mobile terminal 100 displays a text, which is transceived between a user corresponding to the user ID 1320 set on the specific object 1310 and other users, as metadata-related information in a manner of linking the transceived text with the specific object 1310 (FIG. 13B(a)). Alternatively, the mobile terminal 100 can display a latest transceived text (or a most frequently checked text) in association with the user ID 1320 set on the specific object 1310 in a manner of linking the latest transceived text with the specific object 1310 (FIG. 13B(b)).

In this instance, the text, which is transceived between a user corresponding to the user ID 1320 set on the specific object 1310 and other users, or the latest transceived text in association with the user ID 1320 can be provided by the SNS server 1350. Moreover, it can display the relation on the SNS between the user corresponding to the user ID 1320 and other users.

Referring to FIG. 13C, when receiving an input of a user touch action on a specific object 1310 in the course of playing a video, the mobile terminal 100 searches the data from the external server with a search condition set to the specific object 1310 and can then display the found data 1371 to 1373 as the metadata-related information on the specific object 1310. Meanwhile, the mobile terminal 100 can search the data stored in the memory 160 with the search condition set to the specific object 1310.

According to an embodiment of the present invention, when a metadata set for a currently played video is a position information, the mobile terminal 100 establishes a chat session with at least one counterpart terminal currently or previously situated in a place or area indicated by the position information corresponding to the currently played video using the wireless communication unit 110 and can then output a chat content transceived via the established chat session as metadata-related information on the currently played video, under the control of the controller 180. In particular, the mobile terminal 100 can establish a chat session with a counterpart terminal that transmits contents to the content managing server 220 in the place or area indicated by the position information corresponding to the currently played video.

Moreover, when a metadata set for a currently played video is a video identification information, the mobile terminal 100 establishes a chat session with at least one counterpart terminal currently or previously using the video having the same video identification information of the currently played video using the wireless communication unit 110 and can then output a chat content transceived via the established chat session as metadata-related information on the currently played video, under the control of the controller 180.

This is described with reference to FIGS. 14A to 14C as follows. For clarity and convenience of the following description, assume that a position information 'Seorak Mountain, Buk-Myeon, Inje-Gun, Gangwon-Do' is set as metadata for a currently played video. In addition, assume that a video identification information '12345' is set.

Figure 14A:
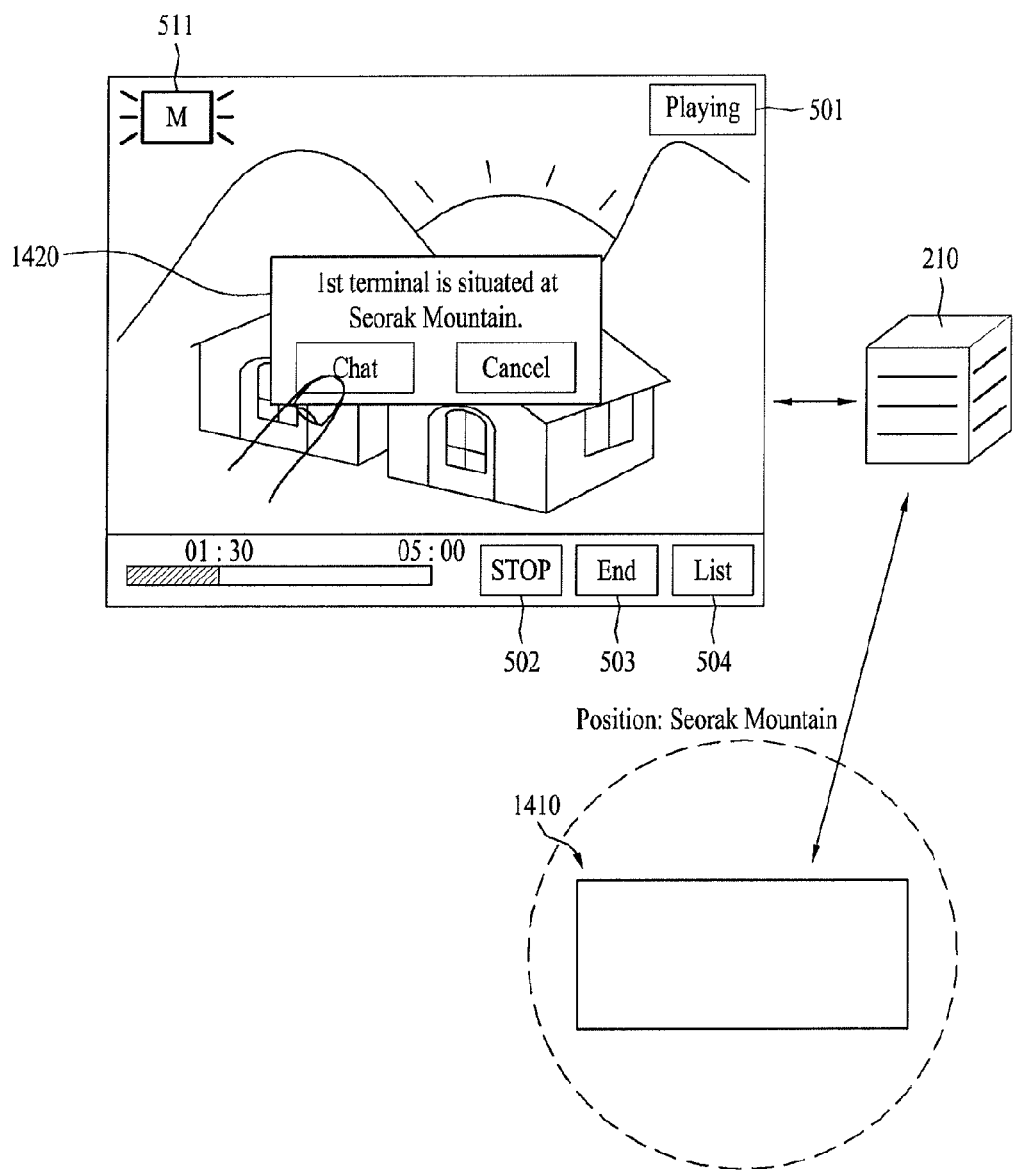
FIGS. 14A to 14C are diagrams for performing a chat by setting a session with a counterpart terminal associated with metadata according to an embodiment of the present invention.
Figure 14B:
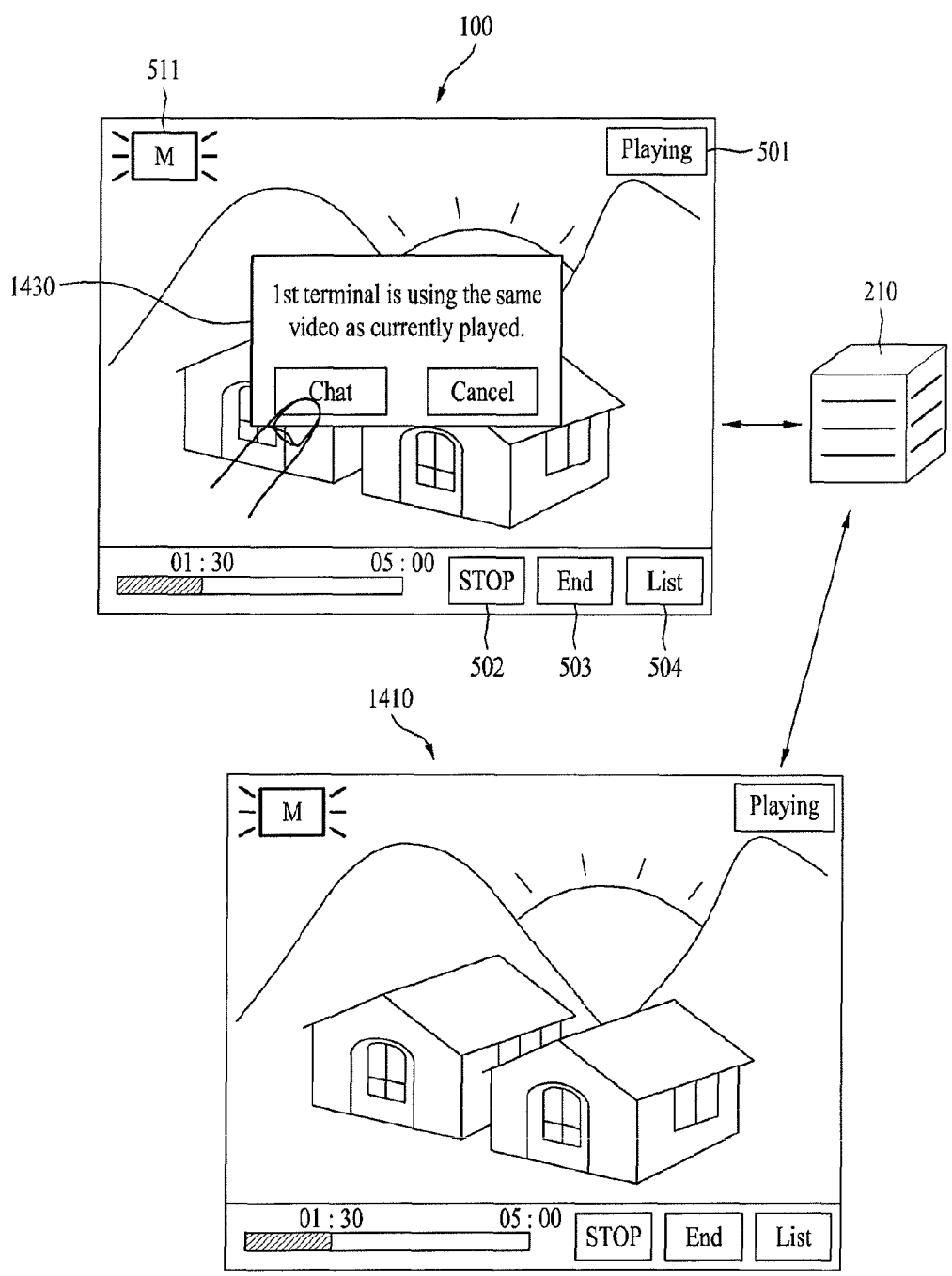
Figure 14C:
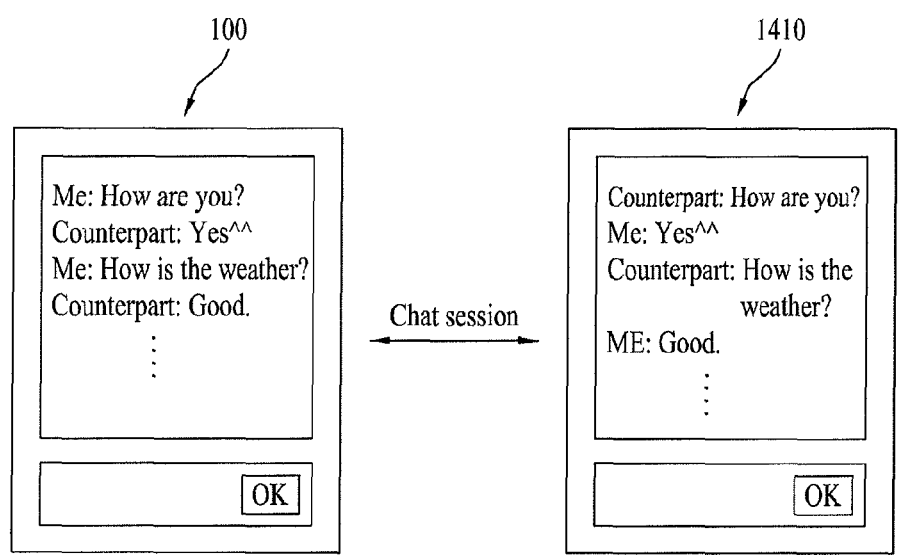

FIGS. 14A to 14C are diagrams for performing a chat by setting a session with a counterpart terminal associated with metadata according to an embodiment of the present invention.

Referring to FIG. 14A, in the course of playing a video, the mobile terminal 100 can output information 1420 indicating that a first terminal 1410 is situated at 'Seorak Mountain' that is the place indicated by a position information set on a currently played video.

In doing so, the mobile terminal 100 receives a signal, which indicates that the first terminal 1410 is currently situated at Seorak Mountain, from the metadata managing server 210 or can receive a signal indicating terminal information on a terminal currently situated at Seorak Mountain from a position managing server (not shown in the drawing).

Referring to FIG. 14B, the mobile terminal 100 can output information 1430 indicating that a currently played video is used by the first terminal 1410 in the course of playing a video. In this instance, it can determine whether the same video is used or not, using a video identification information.

The mobile terminal 100 can receive information on a counterpart terminal, which plays the same video of the mobile terminal 100, from the metadata managing server 210.

Referring to FIG. 14C, the mobile terminal 100 establishes a chat session with the first terminal 1410 and can then output a chat content transceived with the first terminal 1410 using the established chat session as metadata-related information.

In this instance, the chat session establishment is performed via the metadata managing server 210 or can be performed via an external server that performs such a terminal-to-terminal chat service as an instant messaging service and the like.

According to an embodiment of the present invention, when receiving an input of a selection action on a prescribed point of the screen in the course of playing a video, the mobile terminal 100 determines whether metadata is set on an object corresponding to the input point of the selection action, a still image output at the input timing point of the selection action, or a partial video output at the input timing point of the selection action, under the control of the controller 180. If the metadata is set, the mobile terminal 100 can display metadata indication information. In this instance, the metadata indication information can be displayed at the input point of the selection action.

In doing so, the mobile terminal 100 can get more scores if the count of user selections on a metadata-present part is incremented higher. This is to raise the user's interest in the metadata confirmation.

Moreover, when receiving an input of a selection action on the metadata indication information, the mobile terminal 100 can output metadata corresponding to the metadata indication information under the control of the controller 180.

This is described with reference to FIGS. 15A to 15C as follows.

Figure 15A:
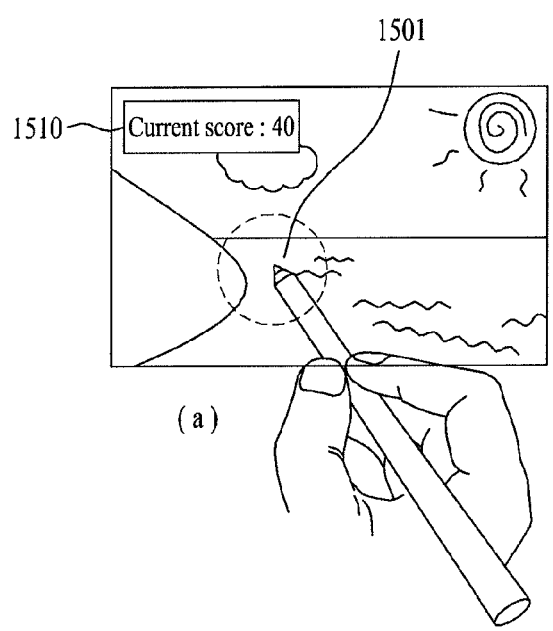
FIGS. 15A to 15C are diagrams for playing metadata-related game according to an embodiment of the present invention.
Figure 15A:
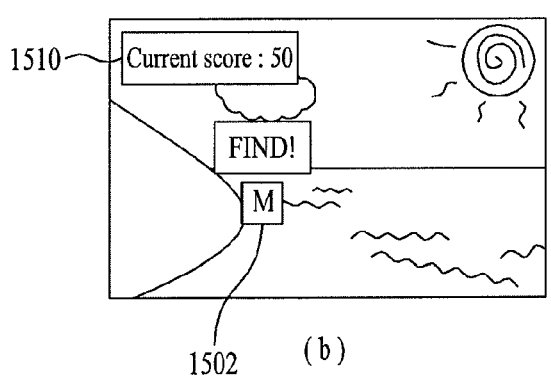
Figure 15B:
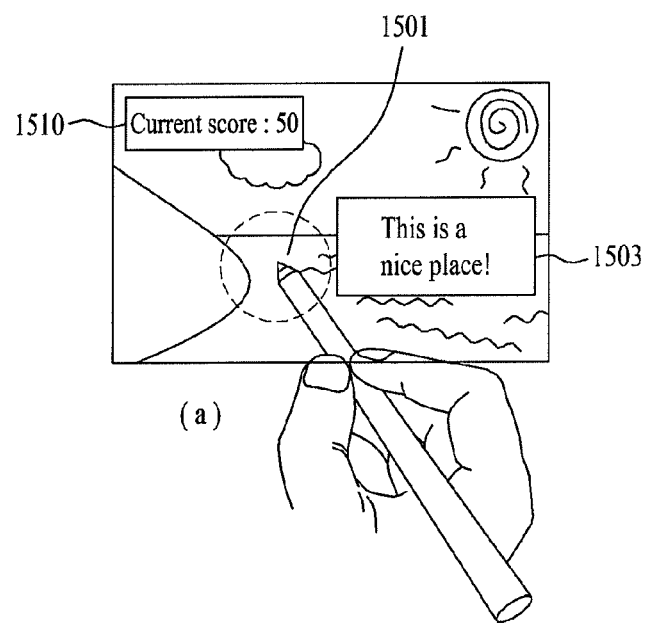
Figure 15B:
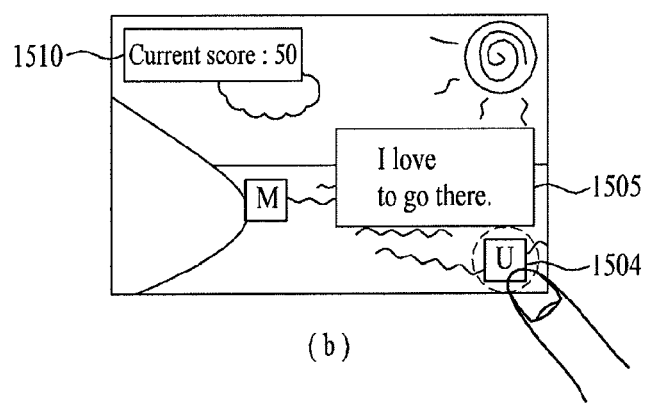
Figure 15C:
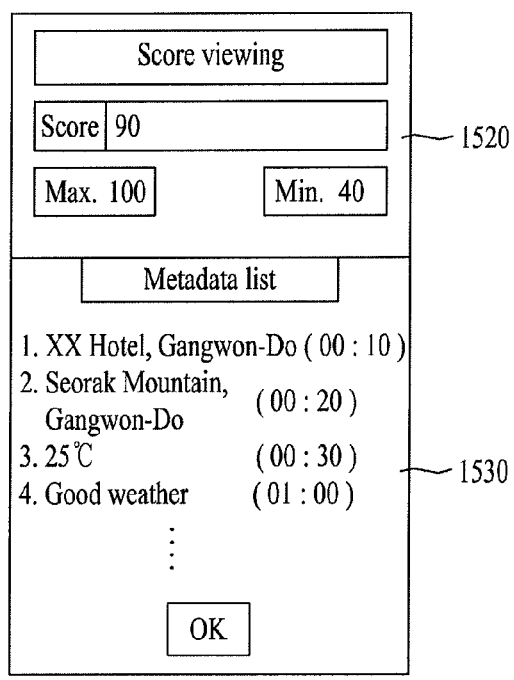

FIGS. 15A to 15C are diagrams for playing a metadata-related game according to an embodiment of the present invention.

Referring to FIG. 15A, the mobile terminal 100 receives an input of a user touch action on a first point 1501 in the course of playing a video (FIG. 15A(a)). If metadata is present at a specific object to which the first point 1501 belongs, the mobile terminal 100 displays an indication icon 1502 as metadata indication information and can then increment the score by 10 points to correspond to an additional winning of metadata once (FIG. 15A(b)). Therefore, the score can be incremented into 50 points from 40 points on a score indication board 1510.

Referring to FIG. 15B, when receiving an input of a user touch action on an indication icon 1502 shown in FIG. 15A(b), the mobile terminal 100 displays the metadata 1503 set on a specific object (FIG. 15B(a)). When receiving an input of a user touch action on an update zone 1504, the mobile terminal 100 enables the metadata 1503 set on the specific object to be stored in the memory 160. In doing so, the mobile terminal 100 can pause the video play.

Referring to FIG. 15C, after completion of the video play, the mobile terminal 100 can display the score 1520 in accordance with the metadata acquisition and a list of a plurality of metadata acquired in the course of the video play. In this instance, contents per metadata, information on an acquisition timing point (e.g. a corresponding play timing point, etc.) and the like can be included in the list 1530.

According to an embodiment of the present invention, the mobile terminal designates metadata filtering information. If a content, on which the metadata meeting the designated metadata filtering information is set, is detected, the mobile terminal 100 can inform a user of the corresponding content detection. In this instance, the metadata filtering information is stored in the memory 160 or can be stored in the metadata managing server 210.

For instance, the metadata filtering information can include at least one of a specific type (e.g., compared to a metadata type), a specific time (e.g., compared to a content play time or a content upload time), a specific counterpart (e.g., compared to a content uploader information), a specific place (e.g., compared to a position information) and the like, as a restriction information on the metadata.

Therefore, when detecting that the content meting the metadata filtering information is stored in the memory 160 or detecting that the corresponding content is uploaded to the content managing server, the mobile terminal 100 outputs the information indicating the detection and enables a user to use the corresponding content.

According to one embodiment of the present invention, the above-described metadata applying methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, the present invention provides a user with metadata of various types set for a currently played video using an effective output method.

Secondly, the present invention can perform various services including chats among a plurality of terminals and the like using metadata of various types set for a currently played video.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a touch screen display unit configured to display a video; and
a controller configured to:
receive metadata that can be displayed in association with at least one object included in at least one scene of the video;
when a specific object included in a currently played scene of the video is selected, search the received metadata for at least one metadata in association with the selected specific object;
control the display unit to display an indication icon indicating the searched at least one metadata is available;
when the indication icon is selected, create metadata related information using the searched at least one metadata;
control the display unit to display the created metadata related information;
control the display unit to display a guide bar showing a current reproduction status of the video; and
control the display unit to display multiple metadata indications on the guide bar indicating where metadata exists within the video,
wherein the multiple metadata indications identify a type of features included in the video including at least one of an object included in the video, a partial portion of the video, and a still picture included in the video, and identify additional information concerning the features displayed in the video that is not viewable without the metadata.

2. The mobile terminal of claim 1, wherein the metadata related information includes at least one of a type of the metadata, a number of the metadata available, and a summary of contents included in the metadata.

3. The mobile terminal of claim 1, wherein the metadata includes at least one of a location of an object included in the video, a temperature of an area included in the video, weather information indicating weather conditions of the area included in the video, and a date indicating a calendar date of when a scene included in the movie occurred.

4. The mobile terminal of claim 1, wherein the controller is further configured to control the wireless communication unit to download and receive the metadata from an external server.

5. The mobile terminal of claim 1, wherein the controller is further configured to display the indication icon indicating the searched at least one metadata is available when receiving a touch input indicating a portion of the displaying video is being touched on the touch screen display unit, and
wherein the metadata corresponds to a still image being output at a receiving timing point of the touch input or a partial video being output at a receiving timing point of the touch input.

6. The mobile terminal of claim 1,
wherein the metadata indications include at least one of a first indication indicating an object in the video includes metadata, a second indication indicating a partial portion of the video includes metadata, a third indication indicating a still image in the video includes metadata, a fourth indication indicating a current position of the video, a fifth indication indicating a number of metadata for the object in the video, the partial portion of the video and the still image in the video, and a sixth indication indicating a type of metadata for the object in the video, the partial portion of the video and the still image in the video.

7. The mobile terminal of claim 6,
wherein upon receiving a touch selection of one of the first, second, third and fourth indications on the metadata information bar, the controller is further configured to display the corresponding metadata for the selected indication.

8. The mobile terminal of claim 1, wherein the controller is further configured to link the metadata with user information registered with a social network service and to control the wireless communication unit to transmit and receive data in association with the metadata and the registered user information to said at least one other terminal.

9. The mobile terminal of claim 1, wherein if the metadata is position information, the controller is further configured to control the wireless communication unit to establish a chat session with the at least one other terminal that is currently or previously situated at a place corresponding to the position information.

10. A method of controlling a mobile terminal, the method comprising:
   allowing, via a wireless communication unit of the mobile terminal, wireless communication with at least one other terminal;
   displaying, via a touch screen display unit of the mobile terminal, a video;
   receiving, via a controller of the mobile terminal, metadata that can be displayed in association with at least one object included in at least one scene of the video;
   when a specific object included in a currently played scene of the video is selected, searching, via the controller, the received metadata for at least one metadata in association with the selected specific object;
   displaying, on the touch screen display unit, an indication icon indicating the searched at least one metadata is available;
   when the indication icon is selected, creating, via the controller, metadata related information using the searched at least one metadata;
   displaying, on the touch screen display unit, the created metadata related information;
   displaying, on the touch screen display unit, a guide bar showing a current reproduction status of the video; and
   displaying, on the touch screen display unit, multiple metadata indications on the guide bar indicating where metadata exists within the video,
   wherein the multiple metadata indications identify a type of features included in the video including at least one of an object included in the video, a partial portion of the video, and a still picture included in the video, and identify additional information concerning the features displayed in the video that is not viewable without the metadata.

11. The method of claim 10, wherein the metadata related information includes at least one of a type of the metadata, a number of the metadata available, and a summary of contents included in the metadata.

12. The method of claim 10, wherein the metadata includes at least one of a location of an object included in the video, a temperature of an area included in the video, weather information indicating weather conditions of the area included in the video, and a date indicating a calendar date of when a scene included in the movie occurred.

13. The method of claim 10, further comprising:
   downloading and receiving, via the controller controlling the wireless communication unit, the metadata from an external server.

14. The method of claim 10, further comprising:
   displaying the indication icon indicating the searched at least one metadata is available when receiving a touch input indicating a portion of the displaying video is being touched on the touch screen display unit, and
   wherein the metadata corresponds to a still image being output at a receiving timing point of the touch input or a partial video being output at a receiving timing point of the touch input.

15. The method of claim 10,
   wherein the metadata indications include at least one of a first indication indicating an object in the video includes metadata, a second indication indicating a partial portion of the video includes metadata, a third indication indicating a still image in the video includes metadata, a fourth indication indicating a current position of the video, a fifth indication indicating a number of metadata for the object in the video, the partial portion of the video and the still image in the video, and a sixth indication indicating a type of metadata for the object in the video, the partial portion of the video and the still image in the video.

16. The method of claim 15,
   wherein upon receiving a touch selection of one of the first, second, third and fourth indications on the metadata information bar, displaying the corresponding metadata for the selected indication.

17. The method of claim 10, further comprising:
   linking, via the controller, the metadata with user information registered with a social network service; and
   transmitting and receiving, via the wireless communication unit, data in association with the metadata and the registered user information to said at least one other terminal.

18. The method of claim 10, wherein if the metadata is position information, the method further comprises establishing, via the wireless communication unit, a chat session with the at least one other terminal that is currently or previously situated at a place corresponding to the position information.

* * * * *